(12) United States Patent
Xie et al.

(10) Patent No.: US 12,458,924 B2
(45) Date of Patent: Nov. 4, 2025

(54) LOW-TEMPERATURE DENITRATION CATALYST

(71) Applicant: COMMONWEALTH SCIENTIFIC AND INDUSTRIAL RESEARCH ORGANISATION, Acton (AU)

(72) Inventors: Zongli Xie, Wheelers Hill (AU); Choon Chian Ng, Carnegie (AU); Yuliang Li, Hebei (CN)

(73) Assignee: Commonwealth Scientific and Industrial Research Organisation, Action (AU)

( * ) Notice: Subject to any disclaimer, the term of this patent is extended or adjusted under 35 U.S.C. 154(b) by 259 days.

(21) Appl. No.: 17/640,581

(22) PCT Filed: Sep. 4, 2020

(86) PCT No.: PCT/CN2020/113505
§ 371 (c)(1),
(2) Date: Mar. 4, 2022

(87) PCT Pub. No.: WO2021/043267
PCT Pub. Date: Mar. 11, 2021

(65) Prior Publication Data
US 2022/0323904 A1 Oct. 13, 2022

(30) Foreign Application Priority Data

Sep. 4, 2019 (CN) .......................... 201910833100.5
Sep. 4, 2019 (CN) .......................... 201910833907.9

(51) Int. Cl.
| | | |
|---|---|---|
| *B01J 27/25* | (2006.01) | |
| *B01D 53/86* | (2006.01) | |
| *B01J 33/00* | (2006.01) | |
| *B01J 37/00* | (2006.01) | |
| *B01J 37/03* | (2006.01) | |
| *B01J 37/08* | (2006.01) | |

(52) U.S. Cl.
CPC .......... *B01D 53/8628* (2013.01); *B01J 27/25* (2013.01); *B01J 33/00* (2013.01); *B01J 37/0009* (2013.01); *B01J 37/031* (2013.01); *B01J 37/08* (2013.01); *B01D 2257/404* (2013.01); *B01D 2258/0283* (2013.01); *B01J 2523/72* (2013.01); *B01J 2523/842* (2013.01)

(58) Field of Classification Search
None
See application file for complete search history.

(56) References Cited

FOREIGN PATENT DOCUMENTS

| | | | |
|---|---|---|---|
| CN | 1283523 A | | 2/2001 |
| CN | 103551092 | * | 2/2014 |
| CN | 104646022 A | | 5/2015 |
| CN | 107029739 | * | 8/2017 |
| CN | 107569984 A | | 1/2018 |
| CN | 110639538 A | | 1/2020 |
| CN | 110639539 A | | 1/2020 |
| CN | 110639540 A | | 1/2020 |
| CN | 110813308 A | | 2/2020 |
| EP | 1604953 | * | 11/2005 |
| EP | 2933018 A1 | | 10/2015 |

OTHER PUBLICATIONS

Li, Yi et al. "Low Temperature Selective Catalytic Reduction of NOX with NH3 over MnFeOx nanorods". Chemical Engineering Journal. 213-222, 330 (2017) (Year: 2017).*
Chang et al., "Effect of Sn on MnOx—CeO2 catalyst for SCR of NOx by ammonia: Enhancement of activity and remarkable resistance to SO2", Catalyst Communications, vol. 27, Oct. 2, 2012 (Oct. 2, 2012), pp. 54-57, XP055787780, ISSN: 1566-7367, DOI: 10.1016/j.catcom.2012.06.022, Oct. 2, 2012.
Sun et al., "Fe—Mn Mixed Oxide Catalysts Synthesized by One-Step Urea-Precipitation Method for the Selective Catalytic Reduction of NOx with NH3 at Low Temperatures", Catalyst Letters, 148(1), Oct. 29, 2017 (Oct. 29, 2017), pp. ea—Precipitation Method for the Selective Catalytic Reduction of NOx with NH3 at Low Temperatures, Catalysis Letters, vol. 148, No. 1, Oct. 29, 2017 (Oct. 29, 2017), pp. 227-234, XP03640301, Oct. 29, 2017.

* cited by examiner

*Primary Examiner* — Sheng H Davis
(74) *Attorney, Agent, or Firm* — Dierker & Kavanaugh, P.C.

(57) ABSTRACT

The present disclosure generally relates to a denitration catalyst, and in particular to a method for preparing the denitration catalyst. The present disclosure also relates to a method for preparing a coated substrate comprising the denitration catalyst. The present invention also relates to use of the denitration catalyst and/or coated substrate at low temperatures and/or humid environments.

11 Claims, 6 Drawing Sheets

LOW-TEMPERATURE DENITRATION CATALYST

FIELD

The present disclosure generally relates to a denitration catalyst, and in particular to a method for preparing the denitration catalyst. The present disclosure also relates to a method for preparing a coated substrate comprising the denitration catalyst. The present invention also relates to use of the denitration catalyst and/or coated substrate at low temperatures and/or humid environments.

BACKGROUND

Greenhouse gas reduction has presented a significant global environmental challenge. The World Health Organization (WHO) recently indicated that ambient air pollution exposure represents the largest environmental risk to human health, with approximately one in nine deaths attributable to poor air quality. Among air pollutants, nitrogen oxide ($NO_x$) emissions have the closest relationship with the human use of fossil energy. It is considered that NOx has substantially contributed to regional atmospheric pollution and environmental quality, and has played an important role in the formation of tropospheric ozone ($O_3$), peroxyacetyl nitrate (PAN, or nitroethaneperoxoate), and aerosols. The major primary source of air pollution is the combustion of fossil fuels used in power stations, motor vehicles and other incineration processes. Nitrogen oxides ($NO_x$) include compounds such as nitrogen dioxide ($NO_2$), nitric oxide (NO), nitrous oxide ($N_2O$), dinitrogen trioxide ($N_2O_3$) and dinitrogen tetroxide ($N_2O_4$). At the point of emission, NOx emitted in combustion processes typically consist of a mixture of 95% of nitric oxide (NO) and 5% nitrogen dioxide ($NO_2$) due to the thermodynamics of the combustion process.

The selective catalytic reduction (SCR) of $NO_x$ has been the most widely used technique for the reduction of $NO_x$ emissions from combustion flue gas. Although a variety of materials show some catalytic activity for this reaction, commercial SCR catalysts are typically based on mixtures of vanadia and titania oxides $V_2O_5$—$WO_3/TiO_2$. Such commercial catalysts, however, generally require high temperatures (HT) in the range of 300-400° C. to maintain high activity and $N_2$ selectivity and are susceptible to particulate and $SO_2$ poisoning. In addition, the flue gas from non-power generation industries is typically of low temperature (LH) and high water vapour content which is an environment that conventional $V_2O_5/TiO_2$ based catalysts perform poorly.

Therefore there is a need to develop alternative SCR NOx catalysts capable of operating effectively at lower temperatures (e.g. low temperature (LT) region of about <200° C.) and/or capable of tolerating higher water vapour environments (e.g. flue gas stream).

SUMMARY

The present disclosure provides a denitration catalyst comprising a calcined reaction product of manganese nitrate and iron nitrate in the presence of an alkaline precipitant. The calcined reaction product can be provided by calcining a precipitated reaction product prepared from manganese nitrate and iron nitrate in the presence of an alkaline precipitant. The grain size of the denitration catalyst may be less than about 2 μm. The calcined reaction product may be prepared from heating the reaction product to a temperature in the range of about 300° C. to about 500° C. The denitration catalyst may further comprise one or more additives. The molar ratio of the manganese nitrate to the iron nitrate may be between about 1:2 to 2:1, preferably about 1:1.

In one aspect, the present disclosure provides a denitration catalyst comprising a calcined reaction product of manganese nitrate and iron nitrate with an alkaline precipitant, wherein the grain size of the denitration catalyst is less than about 0.5 μm. The calcined reaction product can be prepared by heating the precipitated reaction product that is prepared from a solution of manganese nitrate and iron nitrate in the presence of an alkaline precipitant. In another example, the calcined reaction product may be prepared by heating the reaction product of a sonicated solution of manganese nitrate and iron nitrate in the presence of an alkaline precipitant. The heating can be to a temperature in the range of about 300° C. to about 500° C. The denitration catalyst may further comprise one or more additives. The molar ratio of the manganese nitrate to the iron nitrate may be between about 1:2 to 2:1, preferably about 1:1.

In another aspect there is provided a process for preparing a denitration catalyst, comprising: (a) preparing an aqueous mixed-metal nitrate solution comprising a manganese nitrate, an iron nitrate and an alkaline precipitant, to form a mixed-metal hydroxide salt precipitate; and (b) calcining the mixed-metal hydroxide salt precipitate to form the denitration catalyst, wherein the grain size of the denitration catalyst is less than about 0.5 μm. The process may further comprise grinding the calcined denitration catalyst to provide a powdered denitration catalyst. The process of step (a) may comprise a sonication-assisted co-precipitation of the mixed-metal hydroxide salt precipitate.

In another aspect there is provided a process for preparing a denitration catalyst, comprising: (a)(i) preparing an aqueous solution comprising a manganese nitrate and an iron nitrate to form an aqueous mixed-metal nitrate solution; (a)(ii) adding an alkaline precipitant to the aqueous mixed-metal nitrate solution to form a mixed-metal hydroxide salt precipitate; (b)(i) drying the mixed-metal hydroxide salt precipitate at a first temperature to provide a dried denitration catalyst; and (b)(ii) calcining the dried denitration catalyst at a second temperature to provide a calcined denitration catalyst having a grain size of less than about 0.5 μm. The process may further comprise grinding the calcined denitration catalyst to provide a powdered denitration catalyst. The process of step (a)(ii) may be sonication-assisted co-precipitation.

The calcined denitration catalyst may be used to form a coated substrate, for example processed into a powdered denitration catalyst. The process as described above may further comprise step (c): (i) pulverising the powdered denitration catalyst to form a pulverised denitration catalyst; (ii) wet-milling the pulverised denitration catalyst to form a denitration catalyst slurry; (iii) applying the denitration catalyst slurry to a surface of the substrate; and (iv) drying the coated substrate at a third temperature to provide a coated substrate comprising the denitration catalyst. The process of step (c)(ii) may further comprise adding an additive during wet-milling. The process of step (c)(iii) may be by wash coating.

In another aspect, there is provided a coating composition comprising the denitration catalyst according any aspects, embodiments or examples thereof as described herein.

In another aspect, there is provided a coated substrate comprising one or more coatings on a substrate, wherein at least one coating comprises the denitration catalyst, or a composition thereof, according to any aspects, embodiments or examples thereof as described herein.

In another aspect there is provided a method for treating nitrogen oxide ($NO_X$) emissions produced in a gaseous stream, the method comprising passing the gaseous stream through a coated substrate to reduce a substantial portion of NOx to $N_2$ gas and $H_2O$ vapour, wherein the coated substrate is according any aspects, embodiments or examples thereof as described herein.

DETAILED DESCRIPTION

Figure 1:
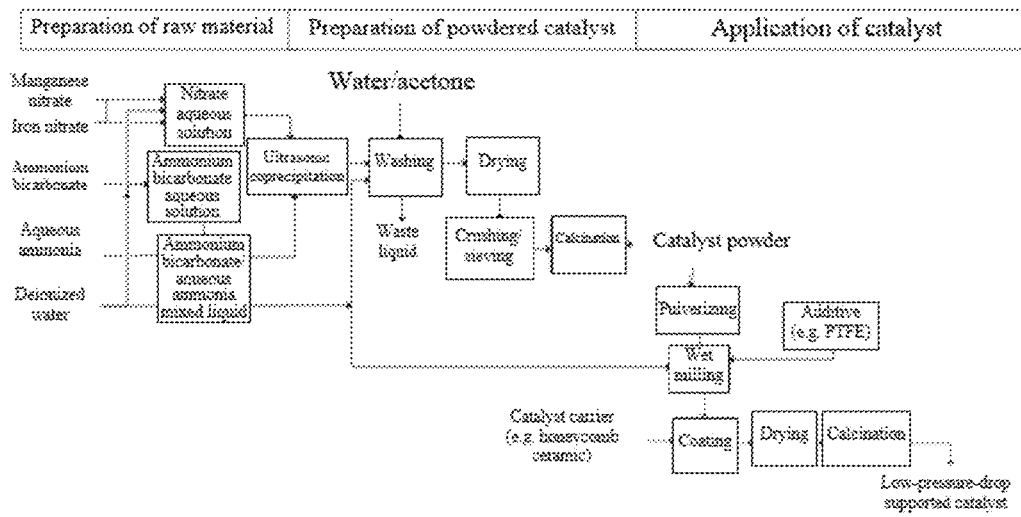
FIG. 1 is a flowchart of a method for preparing a catalyst according to an embodiment of the present disclosure.

The present disclosure describes the following various non-limiting embodiments, which relate to investigations undertaken to identify alternative or improved denitration catalysts. In particular the present disclosure relates to investigations undertaken to identify alternative or improved processes for preparing the denitration catalyst and preparing a coated substrate thereof. The present disclosure also relates to use of the denitration catalysts and/or coated substrates thereof at low temperatures and/or humid environments. The inventors have surprisingly identified that the novel process for preparing the denitration catalyst and/or coated substrate thereof, as described herein, is scalable and can be readily reconfigured into other geometries (e.g. monolith). It was also surprisingly found that depositing the denitration catalyst on the surface of a substrate (e.g. monolith) can provide increased catalytic performance at both low and mid-high temperature ranges.

With more stringent environmental regulations, the low-temperature selective catalytic reduction (LT-SCR) of $NO_x$ by $NH_3$ is becoming increasingly important, for example in power generation, flue gases from the downstream of a desulphurisation unit are treated at lower temperature below 200° C. in order to avoid catalyst poisoning by high dust, high water vapour, high $SO_2$ and impurities, at the same time, minimising energy consumption for reheating flue gases, creating the benefit of lesser energy expenditure and low cost advantage. This is especially true for non-power generation industries where its emission have features of low temperature and high water vapour content. However, commonly used commercial $V_2O_5$—$WO_3$/$TiO_2$ used for $NH_3$-SCR technology has a narrow and high working temperature window (300-400° C.). In addition, $V_2O_5$ is easy to sublimate and toxic to the environment. The present denitration catalyst and/or coated substrate thereof has been shown to provide various advantages. The denitration catalysts and/or coated substrates thereof, as described herein, enable low temperature $NH_3$—SCR of $NO_X$ applications. A wash coating technique has been found to be surprisingly suitable for coating low-pressure drop substrates with the denitration catalyst. The denitration catalyst can provide improved $NO_X$ conversion over a wide temperature window without apparent performance loss. The denitration catalyst can also provide improved operation over a wide humidity window, along with improved water resistance, as well as improved performance at low temperatures.

General Terms

Throughout this disclosure, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Those skilled in the art will appreciate that the disclosure herein is susceptible to variations and modifications other than those specifically described. It is to be understood that the disclosure includes all such variations and modifications. The disclosure also includes all of the steps, features, compositions and compounds referred to or indicated in this specification, individually or collectively, and any and all combinations or any two or more of said steps or features.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The term "consists of", or variations such as "consisting of", refers to the inclusion of any stated element, integer or step, or group of elements, integers or steps, that are recited in context with this term, and excludes any other element, integer or step, or group of elements, integers or steps, that are not recited in context with this term.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

It will be clearly understood that, although a number of prior art publications are referred to herein, this reference does not constitute an admission that any of these documents forms part of the common general knowledge in the art, in Australia or in any other country.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Catalyst Composition

Catalyst Materials

The present disclosure provides a denitration catalyst comprising a calcined reaction product of manganese nitrate and iron nitrate in the presence of an alkaline precipitant. The calcined reaction product can be provided by calcining a precipitated reaction product prepared from manganese nitrate and iron nitrate in the presence of an alkaline precipitant. The grain size of the denitration catalyst may be less than about 0.5 μm. The calcined reaction product may be prepared from heating the reaction product to a temperature in the range of about 300° C. to about 500° C. The denitration catalyst may further comprise one or more additives. The molar ratio of the manganese nitrate to the iron nitrate may be between about 1:2 to 2:1, preferably about 1:1.

In one example, the present disclosure provides a denitration catalyst comprising a calcined reaction product of manganese nitrate and iron nitrate with an alkaline precipitant, wherein the grain size of the denitration catalyst is less than about 0.5 μm. The calcined reaction product can be prepared by heating the precipitated reaction product that is prepared from a solution of manganese nitrate and iron nitrate in the presence of an alkaline precipitant. In another example, the calcined reaction product may be prepared by heating the reaction product of a sonicated solution of manganese nitrate and iron nitrate in the presence of an alkaline precipitant. The heating can be to a temperature in the range of about 300° C. to about 500° C. The denitration catalyst may further comprise one or more additives. The molar ratio of the manganese nitrate to the iron nitrate may be between about 1:2 to 2:1, preferably about 1:1.

The present disclosure relates to a denitration catalyst that can be provided in a wide range of morphologies. Illustrative examples of suitable morphologies may include grains, particles, powders, pellets, beads, coatings, sheets/layers, cast blocks, cylinders, discs, porous membranes and monoliths. For example, the denitration catalyst may be provided as a coating layer where the gaseous stream may be flowed thereon or through the layer. The coating layer may be provided as a coating on a monolith substrate comprising a plurality of porous channels, wherein the gaseous stream flows through. Other layer or coating morphologies and geometries are also applicable.

In one embodiment or example, the denitration catalyst may comprise a plurality of grains or particles. The term "grain" or "particle" may refer to the form of discrete solid units. The units may take the form of flakes, fibres, agglomerates, granules, pellets, powders, beads, spheres, pulverized materials or the like, as well as combinations thereof. The grains or particles may have any desired shape including, but not limited to, cubic, rod like, polyhedral, spherical or semi-spherical, rounded or semi-rounded, angular, irregular, and so forth. The grain or particle morphology can be determined by any suitable means such as optical microscopy.

In some embodiments or examples, the denitration catalyst may be a plurality of grains, particles, powders, pellets, beads, granules, coatings, or sheets/layers. In some embodiments or examples, the grains, particles, powders, pellets, beads, granules, coatings, or sheets/layers may be a composition which further comprises optional additives selected from the group comprising a hydrophobic surface modifier and/or a binder.

The denitration catalyst may be of any suitable size and/or shape and/or morphology. In some embodiments or examples, the denitration catalyst may have an average grain size or particle size. For spherical catalyst, the grain size or particle size is the diameter of the grains or particles. For non-spherical catalyst, the grain size or particle size is the longest cross-section dimension of the grain or particles.

The denitration catalyst, as described herein, may comprise a calcined reaction product of manganese nitrate and iron nitrate with an alkaline precipitant, wherein the grain size of the denitration catalyst may be less than about 0.5 µm. The grain size of the denitration catalyst may be less than about 0.5 µm and can be provided by calcining the precipitated reaction product prepared from manganese nitrate and iron nitrate in the presence of an alkaline precipitant. It will be appreciated that the term "grain" size is used herein to described the diameter of the individual grains of the precipitated reaction product. The term "grain" size as used herein may be different from the term "particle" size and may also be different from the term "crystallite" size. In other words, the term "particle" may refer to agglomeration of two or more grains. The term "grain" may refer to an ensemble of two or more crystallites or may consist of a single crystalline material. The term "crystallite" may be the smallest form and may refer to the size of a single crystal inside a particle or grain.

In some embodiments or examples, the denitration catalyst may have an average grain size in a range of between about 0.01 µm to about 0.5 µm. The denitration catalyst may have an average grain size less than about 0.5, 0.45, 0.4, 0.35, 0.3, 0.25, 0.2, 0.15, 0.1, 0.05, 0.04, 0.03, 0.02 or 0.01 µm. The denitration catalyst may have an average grain size at least about 0.01, 0.02, 0.03, 0.04, 0.05, 0.1, 0.15, 0.2, 0.25, 0.3, 0.35, 0.4, 0.45 or 0.5 µm. Combinations of these amounts are possible, for example the denitration catalyst may have an average grain size between about 0.01 µm to about 0.4 µm, or between about 0.01 µm to about 0.3 µm.

In some embodiments or examples, the denitration catalyst may have an average particle size in a range from about 0.01 µm to about 2 µm, for example from about 0.1 µm to about 2 µm. The catalyst particles may have an average particle size of at least about 0.01, 0.05, 0.1, 0.2, 0.3, 0.4, 0.5, 0.7, 1, 1.5, or 2 µm. In other embodiments or examples, the catalyst particles may have an average particle size of less than about 2, 1.5, 1, 0.7, 0.5, 0.4, 0.3, 0.2, 0.1, 0.05 or 0.01 µm. Combinations of these catalyst values to form various ranges are also possible, for example catalyst particles may have an average particle size of between about 0.3 µm to about 0.7 µm, about 0.4 µm to about 0.6 µm, for example about 0.2 µm to about 1 µm.

The average grain size or particle size can be determined by any means known to the skilled person, such as scanning electron microscopy, dynamic light scattering, optical microscopy or size exclusion methods (such as graduated sieves). In an example, the method of measuring the average grain size or particle size may be scanning electron microscopy. The denitration catalyst may have a controlled average grain size or particle size and can maintain their morphology in a range of different environments and shear conditions, for example while in contact with a gaseous stream and/or moist or dry environments.

In one embodiment or example, the catalyst may be self-supporting. The term "self-supporting" as used herein refers to the ability of the denitration catalyst to maintain its morphology in the absence of a substrate (e.g. monolith). For example, the denitration catalyst may comprise a plurality of particles, wherein the particles maintain their morphology in the absence of a scaffold support. The self-supported nature of the denitration catalyst may provide certain advantages, for example allows particles of denitration catalyst to be contacted with the gaseous stream using a fluidized bed reactor. Accordingly, in one embodiment or example, the denitration catalyst does not comprise a separate substrate, such as a separate monolith. This does not preclude from the denitration catalyst itself being porous in nature. Thus it will be understood that, where the catalyst is "self-supporting", there is no substrate (e.g. monolith) exogenous to the denitration catalyst.

In some embodiments or examples, the catalyst may be provided as a coating composition on a substrate. In some embodiments or examples, the substrate may comprise one or more apertures, designed to assist gas flow through and around the substrate. In a particular embodiment or example, the substrate may comprise a monolith. The use of a monolith can provide a multitude of apertures, (e.g. micro size apertures), thereby providing a high surface area on which the denitration catalyst coating composition can be applied, whilst also providing a suitable flow path having a reasonably low pressure drop across the substrate (relative to the size and configuration of the monolith) compared to other configurations, for example, packed beds.

In some embodiments or examples, the denitration catalyst may have a surface area in a range of from about 20 $m^2/g$ to about 100 $m^2/g$, for example from about 30 $m^2/g$ to about 80 $m^2/g$. The denitration catalyst may have a surface area ($m^2/g$) of at least about 20, 30, 40, 50, 50, 70, 80, 90 or 100 $m^2/g$. In other embodiments or examples, the denitration catalyst may have a surface area ($m^2/g$) of less than about 100, 90, 80, 70, 60, 50, 40, 30 or 20 $m^2/g$. Combinations of these surface area values to form various ranges are also possible, for example the denitration catalyst may have a surface area of between about 40 $m^2/g$ to about 80 $m^2/g$, about 20 $m^2/g$ to about 50 $m^2/g$, for example about 50 $m^2/g$ to about 100 $m^2/g$.

In some embodiments or examples, the density of the denitration catalyst may be in a range of from about 0.3 $g/cm^3$ to about 1.0 $g/cm^3$, for example from about 0.35 $g/cm^3$ to about 0.75 $g/cm^3$. The density of the denitration catalyst may be at least about 0.3, 0.35, 0.4, 0.45, 0.5, 0.55, 0.6, 0.65, 0.7, 0.75, 0.8, 0.85, 0.9, 0.95 or 1.0 $g/cm^3$. In other embodiments or examples, the density of the denitration catalyst may be less than about 1.0, 0.95, 0.9, 0.85, 0.8, 0.75, 0.7, 0.65, 0.6, 0.55, 0.5, 0.45, 0.4, 0.35 or 0.3 $g/cm^3$. Combinations of these density values to form various ranges are also possible, for example the denitration catalyst may have a density of between about 0.3 $g/cm^3$ to about 1.0 $g/cm^3$, or about 0.35 $g/cm^3$ to about 0.75 $g/cm^3$.

The catalytic performance of the denitration catalyst may be effective to provide at least about 50% to about 99% NOx conversion at a temperature in the range of between about 100° C. to about 300° C. In some embodiments or examples, at least about 50%, 55%, 60%, 65%, 70%, 75%, 85%, 90%, 95%, 99% or 99.9% of NOx can be converted to $N_2$ from a gaseous stream. In some embodiments or examples, at least about 85% of NOx can be converted to $N_2$ from a gaseous stream.

Metal Oxide Catalyst

Metal oxide catalysts have relatively high "low-temperature" denitration activity and relatively low costs, and transition metal oxides such as MnOx, CuOx, FeOx, CeOx and ZrOx have effective low-temperature denitration performance. Metal oxide catalysts are subdivided into single metal oxide catalysts and composite metal oxide catalysts. Single metal oxide catalysts have conventional low-temperature denitration performance and are unstable at higher temperatures, while composite oxides have a definite composition and structure, and various metal ions in the structure can be adjusted. The inventors have found that the combination of iron and manganese oxides can show improved catalytic performance and increased reduction of NOx to $N_2$ and $H_2O$ vapour under low temperature conditions. The combination of iron and manganese oxides can provide a denitration catalyst suitable for use in $NH_3$-SCR technology.

The present disclosure provides a denitration catalyst comprising a calcined reaction product of manganese nitrate and iron nitrate in the presence of an alkaline precipitant. The calcined reaction product can be provided by calcining a precipitated reaction product prepared from manganese nitrate and iron nitrate in the presence of an alkaline precipitant. The grain size of the denitration catalyst may be less than about 0.5 μm. The calcined reaction product may be prepared from heating the reaction product to a temperature in the range of about 300° C. to about 500° C. The denitration catalyst, as described herein, may comprise a calcined reaction product of manganese nitrate and iron nitrate with an alkaline precipitant, wherein the grain size of the denitration catalyst may be less than about 0.5 μm. The denitration catalyst may further comprise one or more additives. The molar ratio of the manganese nitrate to the iron nitrate may be between about 1:2 to 2:1, preferably about 1:1.

Further advantages may be provided by the addition of one or more additives. For example, the additive may act as a binder of the catalyst to a substrate, or the additive may provide hydrophobicity to the resultant metal oxides or combination of metal oxides. Use of the additive may provide effective slurry preparation and/or improved coating adhesion of the denitration catalyst on to the substrate, e.g. monolithic support. The denitration catalyst of the present disclosure may comprise one or more additives selected from a hydrophobic surface modifier and/or a binder. The binder may be alumina, silica or combinations thereof. The hydrophobic surface modifier may be polytetrafluoroethylene (PTFE), polydimethylsiloxane (PDMS), cellulose-polydimethylsiloxane (PDMS), cellulose siloxane (CS), or combinations thereof. The inventors have surprisingly found that the phase composition of the denitration catalyst may not be impacted by the addition of an additive (e.g. PTFE or CS).

It will be appreciated that phase analysis of the denitration catalyst may be measured using x-ray powder diffraction (XRD) and the denitration catalyst may comprise a manganese phase comprising any one or more of $MnO_2$, $Mn_2O_3$, and $Mn_3O_4$, and an iron phase comprising any one or more of $Fe_2O_3$, $Fe_3O_4$, FeO and $FeMnO_3$. In some embodiments or examples, the denitration catalyst may comprise two or more of $Mn_2O_3$, $Mn_3O_4$, $Fe_2O_3$, $Fe_3O_4$, with at least one manganese oxide phase and at least one iron oxide phase. For example, the manganese oxide phase may comprise $Mn_2O_3$ and $Mn_3O_4$, and the iron oxide phase may comprise $Fe_2O_3$ and $Fe_3O_4$. The denitration catalysts may be a mixture of $\alpha$-$Fe_2O_3$, $Fe_3O_4$, $Mn_3O_4$ and $FeMnO_3$ phases as well as a notably disordered or highly dispersed $MnO_X$ fraction. For example, Mn(II) and Mn(III) and Fe(III) may be the dominant surface species, with a ratio of iron to manganese of the denitration catalyst and the denitration catalyst with 10% additive (Fe/Mn=0.42 and 0.43, respectively) suggesting manganese contributes significantly to catalytic activity. It was surprisingly found that both the $FeO_X$ and $MnO_X$ phases provided improved redox ability and synergy of reduction. The oxidation states of the $FeO_X$ and $MnO_X$ may be selected from $Mn^{2+}$, $Mn^{3+}$, $Mn^{4+}$, $Fe^{2+}$ or $Fe^{3+}$.

The metal nitrate may be added at a concentration of about 0.2 mol/L to about 6 mol/L. In some embodiments or examples, the amount of metal nitrate may be in a range between about 0.2 to about 6 mol/L. The amount of metal nitrate may be at least about 0.2, 0.5, 1, 2, 3, 4, 5, or 6 mol/L. The amount of metal nitrate may be less than about 6, 5, 4, 3, 2, 1, 0.5 or 0.2 mol/L. Combinations of these amounts are possible, for example the amount of metal nitrate may be between about 0.5 mol/L to about 5 mol/L, or between about 1 mol/L to about 4 mol/L.

The iron nitrate may be selected from the group comprising $Fe(NO_3)_3 \cdot 9H_2O$, $Fe(NO_3)_3 \cdot xH_2O$, $Fe(NO_3)_3 \cdot xH_2O$ and $Fe(NO_3)_3 \cdot xH_2O$, wherein x may be selected from 0, 4, 5, 6, or 9. In an example, the iron nitrate may be $Fe(NO_3)_3 \cdot 9H_2O$. The manganese nitrate may be selected from the group comprising $Mn(NO_3)_2 \cdot 4H_2O$, $Mn(NO_3)_2 \cdot xH_2O$, $Mn(NO_3)_2 \cdot xH_2O$ and $Mn(NO_3)_2 \cdot xH_2O$, wherein x may be selected from 0, 1, 4 or 6. In an example, the manganese nitrate may be $Mn(NO_3)_2 \cdot 4H_2O$.

In an example, the metal nitrate may be $Fe(NO_3)_3 \cdot 9H_2O$ and $Mn(NO_3)_2 \cdot 4H_2O$ in a solution with a total amount of about 1 mol/L (e.g. 0.8 mol/L), with the ratio of $Fe(NO_3)_3 \cdot 9H_2O$ to $Mn(NO_3)_2 \cdot 4H_2O$ in the solution being about 1:1. In another example, the metal nitrate may be $Fe(NO_3)_3 \cdot 9H_2O$ and $Mn(NO_3)_2 \cdot 4H_2O$ in a solution with a total amount of about 3 mol/L, with the ratio of $Fe(NO_3)_3 \cdot 9H_2O$ to $Mn(NO_3)_2 \cdot 4H_2O$ in the solution being about 1:1.

Alkaline Precipitant

The inventors have found that the alkaline precipitant may influence the morphology and structure of the denitration catalyst (e.g $FeO_X$ and $MnO_X$). The alkaline precipitant may facilitates precipitation of a mixed metal hydroxide salt. The alkaline precipitant may be selected from an aqueous solution of ammonia, ammonium nitrate ammonium hydroxide, ammonium bicarbonate, sodium hydroxide, sodium carbonate, or mixtures thereof. In a particularly preferred embodiment or example, the alkaline precipitant may be an aqueous solution of ammonia and/or ammonium bicarbonate, wherein the ratio of ammonia to ammonium bicarbonate may be about 3:0, 2:1, 1:2 or 0:3. For example, the ratio of ammonia to ammonium bicarbonate may be about 1:2. The alkaline precipitant may consist of a mixed solution of an ammonia solution, an ammonia mixture and ammonium bicarbonate.

The alkaline precipitant may be added at a concentration of about 0.2 mol/L to about 6 mol/L. In some embodiments or examples, the amount of alkaline precipitant may be in a range between about 0.2 to about 6 mol/L. The amount of alkaline precipitant may be at least about 0.2, 0.5, 1, 2, 3, 4, 5, or 6 mol/L. The amount of alkaline precipitant may be less than about 6, 5, 4, 3, 2, 1, 0.5 or 0.2 mol/L. Combinations of these amounts are possible, for example the amount of alkaline precipitant may be between about 0.5 mol/L to about 5 mol/L, or between about 1 mol/L to about 4 mol/L. For example, the alkaline precipitant may be a mixed solution of $NH_3$ and $NH_4HCO_3$ with a total amount of about 4 mol/L, with the ratio of $NH_3$ to $NH_4HCO_3$ being about 1:2. In an alternative embodiment or example, the alkaline precipitant may consist of only an ammonium bicarbonate solution, with a total amount of about 3 mol/L.

Additives

Additives that improve water vapour resistance of the denitration catalyst, as described herein, may be added. It will be appreciated that the additive may be added prior to applying the denitration catalyst to a substrate, i.e. the additive may be added during wet-milling of the pulverised denitration catalyst to form a denitration catalyst slurry with the additive. The additive may also act as a binder of the denitration catalyst to a substrate. Preferably, the additive is a nano-additive which may provide hydrophobicity to the resultant metal oxides or combination of metal oxides. Use of the additive may also provide further advantages such as ease of slurry preparation and/or improved coating adhesion on the substrate (e.g. monolithic support).

In some embodiments or examples, one or more additives may be added to the denitration catalyst prior to coating a substrate. The one or more additives may be selected from a hydrophobic surface modifier and/or a binder. The hydrophobic surface modifier may be polytetrafluoroethylene (PTFE), polydimethylsiloxane (PDMS), cellulose-polydimethylsiloxane (PDMS), cellulose siloxane (CS), or combinations thereof. The binder may be alumina, silica, or combinations thereof. In a preferred embodiment or example, the hydrophobic surface modifier may be PTFE and/or CS. For example, the additive may be PTFE. In another example, the additive may be CS. In yet another example, the additive may be a combination of PTFE and CS. The inventors have surprisingly found that the addition of PTFE and/or CS may provide further advantages such as effective slurry preparation and/or improved coating adhesion.

The additive may be added at a concentration of about 0.1 wt. % to about 20 wt. % based on the total weight of the denitration catalyst slurry. In some embodiments or examples, the amount of additive may be in a range between about 0.1 to about 20 wt. % based on the total weight of the denitration catalyst slurry. The amount of additive may be at least about 0.1, 0.5, 1, 2, 3, 4, 5, 6, 7, 8, 9, 10, 11, 12, 13, 14, 15, 16, 17, 18, 19 or 20 wt. %. The amount of additive may be less than about 20, 19, 18, 17, 16, 15, 14, 13, 12, 11, 10, 9, 8, 7, 6, 5, 4, 3, 2, 1, 0.5 or 0.1 wt. %. Combinations of these amounts are possible, for example the amount of additive may be between about 1 wt. % to about 20 wt. %, between about 0.1 wt. % to about 10 wt. %, between about 5 wt. % to about 10 wt. %, between about 2 wt. % to about 15 wt. %, or between about 1 wt. % to about 5 wt. %.

In an example, the addition ratio of the additive may be about 1 wt. % for PTFE. In another example, the addition ratio of the additive may be about 10 wt. % for PTFE. In another example, the addition ratio of the additive may be about 5 wt. % for CS. In yet another example, the addition ratio of the additive may be about 10 wt. % of PTFE to about 0.1 wt. % of CS.

Addition of either polytetrafluoroethylene at about 10 wt. % or cellulose siloxane at about 5 wt. % may provide further advantages such as enhanced water vapour resistance of the denitration catalyst, for example, at low temperature conditions of about less than 150° C. The water vapour inhibition may be reversible upon the removal of water. Use of cellulose siloxane may provide further advantages such as ease of slurry preparation and/or improved coating adhesion on the substrate, e.g. monolithic support.

Catalyst Coated Substrate

Commercial SCR catalyst forms are represented mainly by extruded honeycomb monoliths. The inventors have surprisingly found that improved SCR catalysts can be provided by wash coating a substrate (e.g a monolithic substrate) with a denitration catalyst slurry. In addition to improved catalytic performance, the coated substrate may provide: (i) low pressure drop, (ii) higher geometric surface areas, (iii) abrasion resistance, and (iv) lower tendency to fly ash plugging. For example, cordierite monoliths can be selected as the preferred substrate due to their inherently low pressure drop, high surface area properties, commercial availability and low cost. A further advantage may also be provided such as reduction in catalyst production cost because a significantly lower amount of the denitration catalyst will be required for preparing a coated substrate, as compared with an extruded monoliths.

To enable an effective wash coating process, after obtaining the powdered denitration catalyst, the catalyst may be milled using a ring mill for about 5 minutes to form a pulverised denitration catalyst. In order to obtain the appropriate size, the catalyst was further ball milled in a milling jar with water and 1 µm zirconia milling beads using a high-power vibrating shaker, for example, wet-milling the pulverised denitration catalyst to form a denitration catalyst slurry. The prepared denitration catalyst slurry may be applied to a surface of the substrate, for example, wash coated onto a monolith. It will be appreciated that catalyst loadings may be precisely controlled by adjusting the solid concentration of slurry and the application of wash coating layers. The obtained slurry after the ball milling was sieved, and adjusted with water to achieve the desired solid concentration before wash coating; the monolith was wash coated with the slurry and dried to provide a coated substrate comprising the denitration catalyst. It will be appreciated that an amount of optional additive was added to the denitration catalyst slurry prior applying to the surface of the substrate.

In some embodiments or examples, the catalyst loading may be in a range of between about 10 to about 40 wt. %. based on the total weight of denitration catalyst slurry. The catalyst loading may be at least about 10, 15, 20, 25, 30, 35, or 40 wt. %. The catalyst loading may be less than about 40, 35, 30, 25, 20, 15, or 10 wt. %. Combinations of these amounts are possible, for example the catalyst loading may be between about 10 wt. % to about 30 wt. %, or between about 15 wt. % to about 25 wt. %.

In some embodiments or examples, the amount of additive may be in a range between about 0.1 to about 20 wt. % based on the total weight of the denitration catalyst slurry. The amount of additive may be at least about 0.1, 0.5, 1, 2, 3, 4, 5, 6, 7, 8, 9, 10, 11, 12, 13, 14, 15, 16, 17, 18, 19 or 20 wt. %. The amount of additive may be less than about 20, 19, 18, 17, 16, 15, 14, 13, 12, 11, 10, 9, 8, 7, 6, 5, 4, 3, 2, 1, 0.5 or 0.1 wt. %. Combinations of these amounts are possible, for example the amount of additive may be between about 1 wt. % to about 20 wt. %, between about 0.1 wt. % to about 10 wt. %, between about 5 wt. % to about 10 wt. %, between about 2 wt. % to about 15 wt. %, or between about 1 wt. % to about 5 wt. %.

In some embodiments or examples, the denitration catalyst slurry may have a solids content of between about 5 wt. % to about 40 wt. %. The solids content may be at least about 5, 10, 15, 20, 25, 30, 35, or 40 wt. %. The solids content may be less than about 40, 35, 30, 25, 20, 15, 10, or 5 wt. %. Combinations of these amounts are possible, for example the solids content may be between about 10 wt. % to about 30 wt. %, between about 15 wt. % to about 25 wt. %, between about 20 wt. % to about 35 wt. %, or between about 5 wt. % to about 15 wt. %.

The thickness of the coating applied to the substrate may be between about 1 µm to about 20 µm, preferably about 1 µm to about 5 µm. The thickness may be at least about 1, 2, 5, 10, 15 or 20 µm. The thickness may be less than about 20, 15, 10, 5, 2, or 1 µm. Combinations of these amounts are possible, for example the thickness of the coating applied to the substrate may be between about 1 μm to about 10 μm, or between about 1 μm to about 5 μm.

In some embodiments or examples, the coated substrate may have a plurality of longitudinally extending passages formed by longitudinally extending walls bounding and defining said passages. The passages may comprise inlet passages having an open inlet end and a closed outlet end, and outlet passages having a closed inlet end and an open outlet end.

The coated substrate may have a porosity of from about 60% to about 80%. It will be appreciated that the porosity may provide the coated substrate with high surface area to facilitate reduction of NOx. The coated substrate may have a cell density of from about 100 to about 600 cpsi (1/cm$^2$).

In some embodiments or examples, the coated substrate may comprise a wash coat of the denitration catalyst, as defined herein, wherein the denitration catalyst permeates the walls. For example, the longitudinally extending walls have an inlet side and an opposing outlet side and the denitration catalyst may be coated on both the inlet and outlet sides of the walls.

The substrate may be a monolith substrate and may be comprised of one or more of cordierite, a-alumina, silicon carbide, silicon nitride, zirconia, mullite, spodumene, alumina-silica-magnesia, zirconium silicate, a porous refractory glass, metal or ceramic fibre composite materials. Preferably, the monolith may be comprised of cordierite. It will be appreciated that the geometry of the monolith substrate may vary. For example, the geometry may be plate-type, honeycomb-type, corrugated-type, or woven stainless steel wire mesh-type. In a preferred embodiment or example, the geometry of the monolith substrate may be honeycomb-type.

In some embodiments or examples, the coated substrate, as defined here, may be integrated into a SRC system for NOx reduction.

Process for Preparing a Denitration Catalyst

In some embodiments or examples, there is provided a process for preparing a denitration catalyst. In particular, the present disclosure provides a novel process for preparing a denitration catalyst prepared from the calcined reaction product of manganese nitrate and iron nitrate with an alkaline precipitant, wherein the grain size of the denitration catalyst may be less than about 0.5 μm. The process for preparing a denitration catalyst may comprise: (a) preparing an aqueous mixed-metal nitrate solution comprising a manganese nitrate, an iron nitrate and an alkaline precipitant, to form a mixed-metal hydroxide salt precipitate; and (b) calcining the mixed-metal hydroxide salt precipitate to form the denitration catalyst. In step (b) the grain size of the denitration catalyst can be less than about 0.5 μm.

The calcined reaction product can be prepared by heating the precipitated reaction product that is prepared from a solution of manganese nitrate and iron nitrate in the presence of an alkaline precipitant. In an example, the calcined reaction product may be prepared by heating the reaction product of a sonicated solution of manganese nitrate and iron nitrate in the presence of an alkaline precipitant. The heating can be to a temperature in the range of about 300° C. to about 500° C. to provide the calcined denitration catalyst. The process may further comprise grinding the calcined denitration catalyst to provide a powdered denitration catalyst. The process of step (a) may comprise a sonication-assisted co-precipitation of the mixed-metal hydroxide salt precipitate. The denitration catalyst may further comprise one or more additives. The molar ratio of the manganese nitrate to the iron nitrate may be between about 1:2 to 2:1, preferably about 1:1.

In some embodiments or examples, the process for preparing a denitration catalyst, may comprise the following steps: (a)(i) mixing an aqueous solution comprising a manganese nitrate and an iron nitrate to form an aqueous mixed-metal nitrate solution; (a)(ii) adding an alkaline precipitant to the aqueous mixed-metal nitrate solution to form a mixed-metal hydroxide salt precipitate; (b)(i) drying the mixed-metal hydroxide salt precipitate at a first temperature to provide a dried denitration catalyst; and (b)(ii) calcining the dried denitration catalyst at a second temperature to provide a calcined denitration catalyst having a grain size of less than about 0.5 μm. The process may further comprise grinding the calcined denitration catalyst to provide a powdered denitration catalyst.

The denitration catalyst may have an average grain size in a range of between about 0.01 μm to about 0.5 μm. The denitration catalyst may have an average grain size less than about 0.5, 0.45, 0.4, 0.35, 0.3, 0.25, 0.2, 0.15, 0.1, 0.05, 0.04, 0.03, 0.02 or 0.01 μm. The denitration catalyst may have an average grain size at least about 0.01, 0.02, 0.03, 0.04, 0.05, 0.1, 0.15, 0.2, 0.25, 0.3, 0.35, 0.4, 0.45 or 0.5 μm. Combinations of these amounts are possible, for example the denitration catalyst may have an average grain size between about 0.01 μm to about 0.4 μm, or between about 0.01 μm to about 0.3 μm.

The inventors have surprisingly found that mixing an aqueous solution comprising a manganese nitrate and an iron nitrate to form an aqueous mixed-metal nitrate solution, followed by the addition of an alkaline precipitant to the aqueous mixed-metal nitrate solution to form a mixed-metal hydroxide salt precipitate, may be improved by sonication. The process at step (a)(ii) may be sonication-assisted co-precipitation. The aqueous solution comprising manganese nitrate, iron nitrate, and alkaline precipitant may be continuously fed into a sonication-assisted co-precipitation reactor. The ultrasound assisted co-precipitation synthesis method may result in a calcined denitration catalyst with more uniform morphology compared to conventional precipitation methods and increasing irradiation power unexpectedly provides smaller particles with improved dispersion and higher surface area. Additionally the crystallinity of the calcined denitration catalyst may be lower at high irradiation powers leading to stronger interaction between the MnOx and FeOx. In other words, the calcined denitration catalyst may appear more like a powder and less crystalline.

In some embodiments or examples, the molar ratio of manganese nitrate to iron metal nitrate may be between about 1:2 to 2:1, preferably about 1:1.

The process may further comprises step (a)(iii) aging the mixed-metal hydroxide salt precipitate at room temperature for between about 1 hour and 6 hours.

The process may further comprise step (a)(iv) rinsing the mixed-metal hydroxide salt precipitate in a solvent system. The solvent system may be selected from the group comprising water, alcohol (e.g. ethanol, isopropanol, butanol), ester (e.g. ethyl acetate), ketone (e.g. acetone), or a combination thereof. For example, the solvent may be a combination of water and acetone.

The drying step (b)(i) may comprise applying a first temperature ranging between about 80° C. to about 120° C. to the mixed-metal hydroxide salt precipitate for a first period of about 24 hours to about 48 hours to volatilise at least a portion of volatile material from the mixed-metal hydroxide salt precipitate. The first temperature may be in a range of about 80° C. to about 120° C. The first temperature may be at least about 80, 85, 90, 95, 100, 105, 110, 115, or 120° C. The first temperature may be less than about 120, 115, 110, 105, 100, 95, 90, 85, or 80° C. Combinations of these first temperatures are possible, for example the first temperature may be between about 85° C. to about 115° C., between about 90° C. to about 110° C., or between about 95° C. to about 100° C. The first period may be in a range between about 24 hours to about 48 hours. The first period may be at least about 24, 30, 36, 42, or 48 hours. The first period may be less than about 48, 42, 36, 30, or 24 hours. Combinations of these first periods are possible, for example the first period may be between about 30 to about 42 hours, between about 24 to about 36 hours, or between about 36 to about 48 hours.

The calcining step (b)(ii) may comprise applying a second temperature ranging between about 300° C. to about 500° C. under controlled atmosphere for a second period of about 2 hours to about 10 hours such that a powdered denitration catalyst having a grain of less than 0.5 μm is provided. The second temperature may be in a range between about 300° C. and 500° C. The second temperature may be at least about 300, 350, 400, 450 or 500° C. The second temperature may be less than about 500, 450, 400, 350, or 300° C. Combinations of these second temperatures are possible, for example the second temperature may be between about 350° C. to about 500° C., or between about 400° C. to about 500° C. The second period may be in a range between about 2 hours to about 10 hours. The second period may be at least about 2, 3, 4, 5, 6, 7, 8, 9, or 10 hours. The second period may be less than about 10, 9, 8, 7, 6, 5, 4, 3, or 2 hours. Combinations of these second periods are possible, for example the second period may be between about 3 to about 6 hours, between about 6 to about 10 hours, or between about 4 to about 8 hours.

In some embodiments or examples, the alkaline precipitant may be selected from an aqueous solution of ammonia, ammonium nitrate, ammonium hydroxide, ammonium bicarbonate, sodium hydroxide, sodium carbonate, or mixtures thereof. The alkaline precipitant may be an aqueous solution of ammonia and/or ammonium bicarbonate, wherein the ratio of ammonia to ammonium bicarbonate may be about 3:0, 2:1, 1:2 or 0:3. For example, the ratio of ammonia to ammonium bicarbonate may be about 1:2.

The alkaline precipitant may be added at a concentration of about 0.2 mol/L to about 6 mol/L. In some embodiments or examples, the amount of alkaline precipitant may be in a range between about 0.2 to about 6 mol/L. The amount of alkaline precipitant may be at least about 0.2, 0.5, 1, 2, 3, 4, 5, or 6 mol/L. The amount of alkaline precipitant may be less than about 6, 5, 4, 3, 2, 1, 0.5 or 0.2 mol/L. Combinations of these amounts are possible, for example the amount of alkaline precipitant may be between about 0.5 mol/L to about 5 mol/L, or between about 1 mol/L to about 4 mol/L.

The metal nitrate may be added at a concentration of about 0.2 mol/L to about 6 mol/L. In some embodiments or examples, the amount of metal nitrate may be in a range between about 0.2 to about 6 mol/L. The amount of metal nitrate may be at least about 0.2, 0.5, 1, 2, 3, 4, 5, or 6 mol/L. The amount of metal nitrate may be less than about 6, 5, 4, 3, 2, 1, 0.5 or 0.2 mol/L. Combinations of these amounts are possible, for example the amount of metal nitrate may be between about 0.5 mol/L to about 5 mol/L, or between about 1 mol/L to about 4 mol/L.

The iron nitrate may be selected from the group comprising $Fe(NO_3)_3 \cdot 9H_2O$, $Fe(NO_3)_3 \cdot xH_2O$, $Fe(NO_3)_3 \cdot xH_2O$ and $Fe(NO_3)_3 \cdot xH_2O$, wherein x may be selected from 0, 4, 5, 6, or 9. In an example, the iron nitrate may be $Fe(NO_3)_3 \cdot 9H_2O$. The manganese nitrate may be selected from the group comprising $Mn(NO_3)_2 \cdot 4H_2O$, $Mn(NO_3)_2 \cdot xH_2O$, $Mn(NO_3)_2 \cdot xH_2O$ and $Mn(NO_3)_2 \cdot xH_2O$, wherein x may be selected from 0, 1, 4 or 6. In an example, the manganese nitrate may be $Mn(NO_3)_2 \cdot 4H_2O$.

Process for Preparing a Coated Substrate

The calcined denitration catalyst may be used to form a coated substrate, for example the calcined denitration catalyst can be processed into a powdered denitration catalyst. In some embodiments or examples, there is provided a coating composition comprising the denitration catalyst according any aspects, embodiments or examples thereof as described herein. There is also provided a coated substrate comprising one or more coatings on a substrate, wherein at least one coating comprises the denitration catalyst, or a composition thereof, according to an aspects, embodiments or examples thereof as described herein.

In some embodiments or examples, there is provided a process for preparing a coated substrate comprising applying a powdered denitration catalyst to a substrate. The process for preparing the coated substrate may comprise applying a coating composition comprising the denitration catalyst to the substrate to form the coated substrate comprising one or more coatings on a substrate, wherein at least one coating comprises the denitration catalyst, or a composition thereof.

The process for preparing the coated substrate may comprise processing the calcined denitration catalyst having a grain size of about less than about 0.5 μm into a powdered denitration catalyst by grinding. The process for preparing the coated substrate may comprise step (c): (i) pulverising the powdered denitration catalyst to form a pulverised denitration catalyst; (ii) wet-milling the pulverised denitration catalyst to form a denitration catalyst slurry; (iii) applying the denitration catalyst slurry to a surface of substrate; and (iv) drying the coated substrate at a third temperature to provide a coated substrate comprising the denitration catalyst.

In some embodiments or examples, step (c)(ii) may further comprise adding an additive during wet-milling to form the denitration catalyst slurry. In some embodiments or examples, one or more additives may be added to the denitration catalyst slurry prior to coating the substrate. The one or more additives may be selected from a hydrophobic surface modifier, and a binder. The hydrophobic surface modifier may be polytetrafluoroethylene (PTFE), polydimethylsiloxane (PDMS), cellulose-polydimethylsiloxane (PDMS), cellulose siloxane (CS), or combinations thereof. The binder may be alumina, silica, or combinations thereof. In a preferred embodiment or example, the hydrophobic surface modifier may be PTFE and/or CS. For example, the additive may be PTFE. In another example, the additive may be CS. In yet another example, the additive may be a combination of PTFE and CS. The inventors have unexpectedly found that the addition of PTFE and/or CS may provide further advantages such as effective slurry preparation and/or improved coating adhesion. The additive may be added in an amount in a range between about 0.1 to about 20 wt. % based on the total weight of the denitration catalyst slurry. The amount of additive may be at least about 0.1, 0.5, 1, 2, 3, 4, 5, 6, 7, 8, 9, 10, 11, 12, 13, 14, 15, 16, 17, 18, 19 or 20 wt. %. The amount of additive may be less than about 20, 19, 18, 17, 16, 15, 14, 13, 12, 11, 10, 9, 8, 7, 6, 5, 4, 3, 2, 1, 0.5 or 0.1 wt. %. Combinations of these amounts are possible, for example the amount of additive may be between about 1 wt. % to about 20 wt. %, between about 0.1 wt. % to about 10 wt. %, between about 5 wt. % to about 10 wt. %, between about 2 wt. % to about 15 wt. %, or between about 1 wt. % to about 5 wt. %.

In some embodiments or examples, step (c)(iii) may be by wash coating. The inventors have surprisingly shown that the wash coating deposition technique may provide further advantages for the coated substrate such as an effective and scalable method for the deposition of the denitration catalyst onto a monolith by wash coating the monolith in a denitration catalyst slurry. This technique may include incorporation of additive to facilitate better adhesion or improve specific functionality such as to increase hydrophobicity.

In some embodiments or examples, the drying step (c)(iv) may comprise applying a third temperature ranging between about 100° C. to about 700° C. to the coated substrate for a third period of about 2 to 10 hours to provide a coated substrate comprising the denitration catalyst. The third temperature may be in a range between about 100° C. and 700° C. The third temperature may be at least about 100, 200, 300, 350, 400, 450, 500, 550, 600, 650, or 700° C. The third temperature may be less than about 700, 650, 600, 550, 500, 450, 400, 350, 300, 200, or 100° C. Combinations of these third temperatures are possible, for example the third temperature may be between about 100° C. to about 250° C., between about 400° C. to about 600° C., or between about 450° C. to about 550° C. The third period may be in a range between about 2 hours to about 10 hours. The third period may be at least about 2, 3, 4, 5, 6, 7, 8, 9, or 10 hours. The third period may be less than about 10, 9, 8, 7, 6, 5, 4, 3, or 2 hours. Combinations of these third periods are possible, for example the third period may be between about 30 to about 6 hours, between about 6 to about 10 hours, or between about 4 to about 8 hours.

In some embodiments or examples, the catalyst loading may be in a range of between about 10 to about 40 wt. % based on the total weight of denitration catalyst slurry. The catalyst loading may be at least about 10, 15, 20, 25, 30, 35, or 40 wt. %. The catalyst loading may be less than about 40, 35, 30, 25, 20, 15, or 10 wt. %. Combinations of these amounts are possible, for example the catalyst loading may be between about 10 wt. % to about 30 wt. %, or between about 15 wt. % to about 25 wt. %.

In some embodiments or examples, the denitration catalyst slurry may have a solids content of between about 5 wt. % to about 40 wt. %. The solids content may be at least about 5, 10, 15, 20, 25, 30, 35, or 40 wt. %. The solids content may be less than about 40, 35, 30, 25, 20, 15, 10, or 5 wt. %. Combinations of these amounts are possible, for example the solids content may be between about 10 wt. % to about 30 wt. %, between about 15 wt. % to about 25 wt. %, between about 20 wt. % to about 35 wt. %, or between about 5 wt. % to about 15 wt. %.

The thickness of the coating applied to a substrate may be between about 1 μm to about 20 μm, preferably about 1 μm to about 5 μm. The thickness may be at least about 1, 2, 5, 10, 15 or 20 μm. The thickness may be less than about 20, 15, 10, 5, 2, or 1 μm. Combinations of these amounts are possible, for example the thickness of the coating applied to a substrate may be between about 1 μm to about 10 μm, or between about 1 μm to about 5 μm.

In some embodiments or examples, the substrate may be a monolith substrate and may be comprised of one or more of cordierite, a-alumina, silicon carbide, silicon nitride, zirconia, mullite, spodumene, alumina-silica-magnesia, zirconium silicate, a porous refractory glass, metal or ceramic fibre composite materials. Preferably, the monolith may be comprised of cordierite. It will be appreciated that the geometry of the monolith substrate may vary. For example, the geometry may be plate-type, honeycomb-type, corrugated-type, or woven stainless steel wire mesh-type. In a preferred embodiment or example, the geometry of the monolith substrate may be honeycomb-type. The preformed commercial honeycomb-type ceramic monolithic substrate may be wash coated with the denitration catalyst to provide one or more layers of the denitration catalyst on the surface of the substrate to form the coated substrate.

Ammonia Selective Denitration Reaction

There are generally two types of reaction mechanisms of low-temperature $NH_3$-SCR (selective catalytic reaction). One is the Eley-Rideal (ER) mechanism that the gaseous NO first reacts with activated $NH_3$-absorbed species to form intermediates and then decomposes into $N_2$ and $H_2O$. Another is the Langmuir-Hinshelwood (LH) mechanism that the gaseous NO are absorbed on basic sites and further combine with the adjacent activated $NH_3$ species to form $N_2$ and $H_2O$.

The chemical equation for a stoichiometric reaction using either anhydrous or aqueous ammonia for a selective catalytic reduction process may be:

$$4NO + 4NH_3 + O_2 \rightarrow 4N_2 + 6H_2O$$

$$2NO_2 + 4NH_3 + O_2 \rightarrow 3N_2 + 6H_2O$$

$$NO + NO_2 + 2NH_3 \rightarrow 2N_2 + 3H_2O$$

In some embodiments or examples, there is provided a method for treating nitrogen oxide ($NO_x$) emissions produced in a gaseous stream, the method may comprises passing the gaseous stream through a coated substrate to reduce a substantial portion of NOx to $N_2$ gas and $H_2O$ vapour, wherein the coated substrate may be as defined herein. The method may comprise heating the coated substrate to a temperature range of between about 100° C. to about 300° C. to reduce a substantial portion of NOx to $N_2$ gas and $H_2O$ vapour. The temperature may be at least 100, 120, 140, 160, 180, 200, 220, 240, 260, 280, or 300° C. The temperature may be less than about 300, 270, 250, 230, 200, 170, 150, 130, or 100° C. Combinations of these temperatures are possible, for example the temperature may be between about 100° C. to about 200° C., between about 120° C. to about 180° C., or between about 140° C. to about 160° C.

In some embodiments or examples, the gaseous stream may be flue gas or gas produced from incineration processes or a stationary source. The coated substrate may be particularly useful on large utility boilers, industrial boilers, and municipal solid waste boilers and can reduce NOx emissions by about 50% to about 99%, preferably about 85% to about 99%. In some embodiments or examples, at least about 50% to about 99% of NOx can be converted to $N_2$ gas and $H_2O$ vapour. For example, at least about 50%, 55%, 60%, 65%, 70%, 75%, 85%, 90%, 95%, 99% or 99.9% of NOx can be converted to $N_2$ from the gaseous stream. Preferably, at least about 85% of NOx can be converted to $N_2$ from a gaseous stream. More preferably, at least about 90% of NOx can be converted to $N_2$ from a gaseous stream It will be appreciated that steam generators in large power plants and process furnaces in large refineries, petrochemical and chemical plants, and incinerators burn considerable amounts of fossil fuels and therefore emit large amounts of gas (e.g. flue gas) to the ambient atmosphere. The content of NOx in the gaseous stream may be in a range of between about 0.01 to about 0.2%. The content of NOx may be at least about 0.01, 0.02, 0.05, 0.1, 0.15 or 0.20%. The content of NOx may be less than about 0.2, 0.15, 0.1, 0.05, 0.02, or 0.01%. Combinations of these amounts are possible, for example the content of NOx in the gaseous stream may be between about 0.02% to about 0.15%, or between about 0.05% to about 0.1%.

A design parameter in a reactor may typically be referred to as space velocity (SV). SV may be a measure of the residence time of the gas (e.g. flue gas) mixture (at STP) within the catalyst volume. The SV may be used in calculating the amount of catalyst required per unit time for a given volume of gas (e.g. flue gas) in a gaseous stream. In some embodiments or examples, the gaseous stream has no gas hourly space velocity (GHSV), e.g. 0 $h^{-1}$. In some embodiments or examples, the gaseous stream has a gas hourly space velocity (GHSV) of between about 1000 $h^{-1}$ to about 30000 $h^{-1}$. The gas hourly space velocity ($h^{-1}$) of the gaseous stream may be at least about 1000, 2000, 3000, 4000, 5000, 7500, 10000, 15000, 20000, 25000, 30000, 35000, 40000, 45000 or 50000 $h^{-1}$. The gas hourly space velocity ($h^{-1}$) of the gaseous stream may be less than about 50000, 45000, 40000, 35000, 30000, 25000, 20000, 15000, 10000, 7500, 5000, 4000, 3000, 2000 or 1000 $h^{-1}$. Combinations of these gas hourly space velocities are possible, for example the gas hourly space velocity of the gaseous stream may be between about 2000 $h^{-1}$ to about 45000 $h^{-1}$, between about 5000 $h^{-1}$ to about 40000 $h^{-1}$, or between about 7000 $h^{-1}$ to about 30000 $h^{-1}$. In some embodiments or examples, increasing the gas hourly space velocity ($h^{-1}$) of the gaseous stream as it contacts the coated substrate may lead to a faster rate of NOx reduction by the denitration catalyst. For industrial scale applications, the gas hourly space velocity ($h^{-1}$) of the gaseous stream may be up to 60000 $h^{-1}$. In some embodiments or examples, the gaseous stream has no flow rate (e.g. an ambient atmosphere).

The gaseous stream may contain an amount of water vapour, i.e. the gaseous steam may be a humid environment. For example, the concentration of water vapour present in the gaseous stream may be in a range between about 0.1% and about 15 vol %. The concentration of water vapour may be less than about 15, 12, 10, 8, 6, 4, 2, 1, 0.5, or 0.1 vol %. The concentration of water vapour may be at least 0.1, 0.5, 1, 2, 4, 6, 8, 10, 12, or 15 vol %. The concentration of water vapour present in the gaseous stream may be between any two of these values, for example between about 1 vol % and about 12 vol %, about 2 vol % and about 10 vol %, about 4 vol % and about 8 vol %. $MnO_X$ catalyst prepared via co-precipitation can achieve >98% NO conversion over a temperature range of 80 to 150° C. However, MnOx also demonstrated the high susceptibility to water vapour ($H_2O$) and $SO_2$ inhibition at low temperatures, and $H_2O$ was a particularly pervasive contaminant in this range. Water deactivation of metal oxide catalysts can be caused by the direct competition of $H_2O$ with $NH_3$ adsorption on the catalyst surface as well as $H_2O$ decomposition to thermally stable hydroxyls at active sites. The inventors have surprisingly found that the denitration catalyst as defined herein, and/or the coated substrates thereof, can provide improved water resistance compared to MnOx. For example, the coated substrate unexpectedly provided greater than 85% NOx conversion at low temperature (e.g. 150° C.) when subjected to a gaseous stream comprising a high water vapour concentration (e.g. 10 vol %).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Any one of the following numbered paragraphs, or any combination of these paragraphs, can provide further examples of the present disclosure:

1. A method for preparing a low-pressure-drop denitration catalyst, comprising:
    Step 1: preparing a raw material, wherein the raw material is a catalyst precursor and consists of two components, i.e., a metal nitrate solution and an alkaline solution, wherein the metal nitrate solution comprises equal amounts of iron and manganese, and the alkaline solution consists of a mixed solution of an ammonia solution, an ammonia mixture and ammonium bicarbonate, or consists of only an ammonium bicarbonate solution;
    Step 2: preparing a powdered catalyst; and
    Step 3: applying the catalyst.
2. The method for preparing a low-pressure-drop denitration catalyst as defined above, wherein the metal nitrate solution further comprises deionized water as an additive of the metal nitrate.
3. The method for preparing a low-pressure-drop denitration catalyst as defined above, wherein the Step 2 comprises:
    Step 21: pumping the prepared precursor into a high-power ultrasonic reactor with a power of 500 watts and a frequency of 20 kHz at a flow rate of 50 ml/s to 200 ml/s, and upon application to the precursor that continuously flows in a reaction tank with a stainless steel shell, the liquid is formed into a slurry state;
    Step 22: washing the collected mud in a centrifuge or a rotary dryer three times with water or once with acetone to form a precipitate, wherein the collected slurry needs to stand for 5 hours before washing, and a waste liquid is discharged during the washing process and after washing;
    Step 23: further drying the formed precipitate at room temperature for 24 hours or more, and then coarsely grinding the precipitate into broken pieces;
    Step 24: placing the coarsely ground broken pieces as a semi-finished product into a furnace for calcination, and with a temperature rising rate of 10° C./min, calcining the semi-finished catalyst in a programmable furnace at 500° C. for 3 h; and
    Step 25: grinding the calcined catalyst by means of a ring mill for a grinding time of about 10 minutes into a particle diameter of submicron <2 μm to finally form a powdered catalyst.
4. The method for preparing a low-pressure-drop denitration catalyst as defined above, wherein the Step 3 comprises:
    Step 31: pulverizing the catalyst powder obtained in Step 2;
    Step 32: wet-milling the pulverized catalyst powder using a wet mill, and adding an additive during the wet-milling process;
    Step 33: coating a catalyst carrier;
    Step 34: drying the catalyst-coated catalyst carrier at room temperature; and
    Step 35: placing the dried catalyst carrier into a furnace for calcination to obtain a low-pressure-drop supported calcined monolithic catalyst.

5. The method for preparing a low-pressure-drop denitration catalyst as defined above, wherein the Step 31 comprises powder pulverizing by means of a dry ring milling process, wherein the equipment used is an end mill grinder, which is a grinder with a power of AC 220 V/180 W and a milling cutter diameter of Φ3-Φ13.
6. The method for preparing a low-pressure-drop denitration catalyst as defined above, wherein the additive in the Step 32 is PTFE.
7. The method for preparing a low-pressure-drop denitration catalyst as defined above, wherein the Step 33 comprises: cutting a monolithic material to prepare a substrate, then washing the substrate, and coating the washed substrate with the wet-milled catalyst to form a washed coating.
8. The method for preparing a low-pressure-drop denitration catalyst as defined above, wherein the catalyst carrier in the Step 33 is honeycomb ceramic.
9. A non-toxic waterproof low-temperature denitration catalyst, consisting of a metal nitrate, an alkaline precipitant, and an additive.
10. The non-toxic waterproof low-temperature denitration catalyst as defined above, wherein the metal nitrate is $Fe(NO_3)_3 \cdot 9H_2O$ and $Mn(NO_3)_2 \cdot 4H_2O$ in a solution with a total amount of 1-3 mol/L, with the ratio of $Fe(NO_3)_3 \cdot 9H_2O$ to $Mn(NO_3)_2 \cdot 4H_2O$ in a solution being 1:1.
11. The non-toxic waterproof low-temperature denitration catalyst as defined above, wherein the alkaline precipitant consists of a mixed solution of an ammonia solution, an ammonia mixture and ammonium bicarbonate, or consists of only an ammonium bicarbonate solution.
12. The non-toxic waterproof low-temperature denitration catalyst as defined above, wherein the alkaline precipitant is a mixed solution of $NH_4HCO_3$ and $NH_3$ with a total amount of 1-3 mol/L, with the ratio of $NH_4HCO_3$ to $NH_3$ being 2:1.
13. The non-toxic waterproof low-temperature denitration catalyst as defined above, wherein the additive is polytetrafluoroethylene and cellulose siloxane.
14. The non-toxic waterproof low-temperature denitration catalyst as defined above, wherein the addition ratio of the additive is 1%-10% for polytetrafluoroethylene and 0.1%-10% for cellulose siloxane.
15. A method for preparing the non-toxic waterproof low-temperature denitration catalyst as defined above, comprising:
    Step 1: preparing a raw material, wherein the raw material is a catalyst precursor and consists of two components, i.e., a metal nitrate solution and an alkaline precipitant; and
    Step 2: preparing a powdered catalyst.
16. The preparation method as defined above, wherein the metal nitrate solution further comprises deionized water as an additive of the metal nitrate solution.
17. The preparation method as defined above, wherein the Step 2 comprises:
    Step 21: pumping the prepared precursor into a high-power ultrasonic reactor with a power of 500 watts and a frequency of 20 kHz at a flow rate of 50 ml/s to 200 ml/s, and upon application to the precursor that continuously flows in a reaction tank with a stainless steel shell, the liquid is formed into a slurry state;
    Step 22: washing the collected slurry in a centrifuge or a rotary dryer three times with water or once with acetone to form a precipitate, wherein the collected mud needs to stand for 5 hours before washing, and a waste liquid is discharged during the washing process and after washing;
    Step 23: further drying the formed precipitate at room temperature for 24 hours or more, and then coarsely grinding the precipitate into broken pieces;
    Step 24: placing the coarsely ground broken pieces as a semi-finished product into a furnace for calcination, and with a temperature rising rate of 10° C./min, calcining the semi-finished catalyst in a programmable furnace at 500° C. for 3 h; and
    Step 25: grinding the calcined catalyst by means of a ring mill for a grinding time of about 10 minutes into a particle diameter of submicron <2 μm to finally form a non-toxic waterproof low-temperature denitration powdered catalyst.
18. The preparation method as defined above, further comprising Step 3: applying the catalyst, wherein the Step 3 comprises:
    Step 31: pulverizing the catalyst powder obtained in Step 2;
    Step 32: wet-milling the pulverized catalyst powder, and adding an additive during the wet-milling process;
    Step 33: coating a catalyst carrier;
    Step 34: drying the catalyst-coated catalyst carrier at room temperature; and
    Step 35: placing the dried catalyst carrier into a furnace for calcination to obtain a non-toxic waterproof low-temperature denitration supported catalyst.

EXAMPLES

The present disclosure is further described by the following examples. It is to be understood that the following description is for the purpose of describing particular examples only and is not intended to be limiting with respect to the above description.

Example 1a—Synthesis of MnOx/FeOx Catalyst

All materials were used as received: manganese (II) nitrate tetrahydrate, $Mn(NO_3)_2 \cdot 4H_2O$ (purum≥97%, Sigma Aldrich), iron (III) nitrate nonahydrate, $Fe_2(NO_3)_3 \cdot 9H_2O$ (≥99%, Merck), sodium hydroxide, NaOH (≥99%, Merck), sodium carbonate, $Na_2CO_3$ (AnalR, 99.9%, BDH), aqueous ammonia, $NH_3$ (reagent grade 25%, Chemsupply), ammonium bicarbonate, $NH_4HCO_3$ (technical grade, Chemsupply).

The catalyst was synthesized according to the following general method and according to the process shown in FIG. 1:

The catalyst was prepared by sonication assisted continuous co-precipitation with ammonia/ammonium bicarbonate (ABC), at various ratios (Table 1). Aqueous solution of Mn and Fe nitrate (equimolar with respect to metal ions) and basic solution consisting of mixture of ammonia and ammonium bicarbonate were pumped (flow rates from 50 mL to 200 mL) into a high-powered (500 W, 20 kHz) ultrasound reactor consisting of a continuous flow cell with stainless steel casing. The precipitates in the form of slurry was collected and left to age for 5 h before washing with water (triple wash) and acetone (once) in a centrifuge machine. The formed precipitate was further dried at room temperature for over 24 h and then calcined at 500° C. for 3 h at a ramp rate 10° C./min in a programmable furnace to provide a calcined denitration catalyst having a grain size of less than about 0.5 μm. The catalysts synthesised via this method were denoted as SACP and its ammonia:ammonium bicarbonate ratios varieties are denoted as SCP14, SCP16, SCP35, SCP24.

Table 1 shows that when increasing the usage of ABC as the precipitating agent, pore volume and pore diameter are also increased. Using ABC alone almost doubled the pore volume and diameter compared to using ammonia only, suggesting that the higher usage of ABC resulted in formation of particle size and geometry that could potentially promote improved interactions between reactants and active sites on the catalyst surfaces.

Table 2 shows that manipulating precipitating agents at different ratios affect the distribution of Mn oxidation states, higher ammonia amount seems to give rise to Mn in higher oxidation state and vice versa. However, its presence is quantitatively small, e.g. Ammonia: ABC=3:0 only has 6 wt % $MnO_2$ ($Mn^{4+}$) but undetected amount of $Mn^{3+}$ and $Mn^{3+,2+}$. On the other hand, use of ABC only (0:3) encouraged the formation of $Mn^{3+,2+}$ at 15.3 wt % $Mn_3O_4$, the same trend was displayed by the mixture of ammonia and ABC; with higher ammonia usage favours the formation of Mn in higher oxidation states.

Table 3 shows that different ammonia: ratios generally do not affect Fe:Mn ratio except the scenario when only ammonia was used. The use of ammonia alone as the precipitating agent could possibly have increased the pH too excessively for the buffer solution, which might not be ideal for use in co-precipitation process, hence nucleation and growth of crystal compound might not be complete. Consequently, a loss of composition was observed.

TABLE 1

Summary of BET, total pore volume and pore diameter for SCP catalysts, varying precipitating agents ratios

| Catalyst | Ammonia:ABC Molar ratio | BET surface area A ($m^2/g$) | Pore Volume Vt ($cm^3/g$) | Pore Diameter D (nm) |
|---|---|---|---|---|
| SCP14 | 3:0 | 66.2 | 0.183 | 11.07 |
| SCP16 | 2:1 | 70.9 | 0.205 | 11.60 |
| SCP35 | 1:2 | 60.0 | 0.211 | 14.09 |
| SCP24 | 0:3 | 83.3 | 0.444 | 21.31 |

TABLE 2

XRD semi-quantitative phase analysis for catalysts prepared via sonication assisted continuous co-precipitation, varying precipitating reagents ratios

| Catalyst | Ammonia:ABC molar ratio | Identified phase (wt %)* | | | | |
|---|---|---|---|---|---|---|
| | | $MnO_2$ | $Mn_2O_3$ | $Mn_3O_4$ | $Fe_2O_3$ | $Fe_3O_4$ |
| SCP16 | 2:1 | 5.9 | NI | 4.6 | 89.5 | NI |
| SCP35 | 1:2 | NI | 9.0 | 16.7 | 56.5 | 17.8 |
| SCP14 | 3:0 | 6.0 | NI | NI | 94.0 | NI |
| SCP24 | 0:3 | NI | NI | 15.3 | 84.7 | NI |

*semi quantitative only
NI not detectable

TABLE 3

ICP elemental analysis for catalysts prepared via sonication assisted continuous co-precipitation, varying precipitating reagents ratios

| Catalyst | Ammonia:ABC molar ratio | Elemental composition (wt %) | | Fe/ (Fe + Mn) |
|---|---|---|---|---|
| | | Fe | Mn | |
| SCP16 | 2:1 | 37.91 | 38.08 | 0.50 |
| SCP35 | 1:2 | 39.44 | 39.29 | 0.50 |
| SCP14 | 3:0 | 54.53 | 22.52 | 0.71 |
| SCP24 | 0:3 | 41.65 | 34.43 | 0.55 |

MnOx/FeOx catalysts were also synthesized using precipitation methods with alkalis (i.e. without sonication). The mixed Mn—Fe nitrate solutions were added to either NaOH (0.5 M) or $Na_2CO_3$ (0.5 M) under constant stirring until pH of solution was about 8 to ensure that all of the metal ions were precipitated. The resulted precipitate was aged for about 1.5 h before starting centrifuge assisted washing with deionised water (centrifuging at 1000 rpm, decanting supernatant liquid, then adding deionised water again for 5 cycles). The sediment was dried at 120° C. for 16 h and then calcined at 500° C. for 4 h at a ramp rate of 10° C./min. The catalysts were denoted P—OH and P—CO, respectively.

XRD semi-quantitative phase analysis of the SACP, P—OH, and P—CO are given in Table 4.

TABLE 4

XRD semi-quantitative phase analysis for the fabricated catalysts.

| Catalyst | Identified phase (wt %)* | | | | | | |
|---|---|---|---|---|---|---|---|
| | $MnO_2$ | $Mn_2O_3$ | $Mn_3O_4$ | $Fe_2O_3$ | $Fe_3O_4$ | FeO | $FeMnO_3$ |
| SACP | — | 3.7 | 22 | 55 | 19 | — | — |
| P—CO | 29.6 ± 0.7 | — | — | 66.7 ± 0.9 | — | 2.0 ± 0.5 | 1.8 ± 0.6 |
| P—OH | — | — | — | 100 | — | — | — |

*semi quantitative only
— denotes undetectable

It was found that the crystal phases are dependent on the preparation methods. From Table 4, SACP catalyst mainly consist of manganese oxides and/or iron oxides in four identifiable crystalline phases, i.e. manganese oxide $Mn_2O_3$, haumannite $Mn_3O_4$, hematite $Fe_2O_3$ and magnetite $Fe_3O_4$. All these species are in higher oxidation forms of Mn and Fe since all prepared samples were calcined at an elevated temperature of 500° C. Catalysts made from precipitation methods using NaOH or $Na_2CO_3$ produced two very different catalysts in terms of crystallinity. The bulk of P—OH mainly composed of hematite $Fe_2O_3$ structure with no obvious of the $MnO_x$. This may be attributed to $MnO_x$ particles deposited on $Fe_2O_3$ particles being too small to be detected. P—CO on the other hand gave three additional species apart from the bulk ~67% w/w of $Fe_2O_3$ as compared to P—OH; namely, $MnO_2$ (~30% w/w in bulk) and to a lesser extent $FeMnO3$ and $FeO$, with both close to 2% w/w, respectively.

Example 1b—Synthesis of MnOx/FeOx Catalyst with Additive

All metal oxides ($MnO_X/FeO_X$) based catalyst samples were prepared using Iron(III) nitrate nonahydrate ($Fe(NO_3)_3 \cdot 9H_2O$, CAS 7782-61-8, ≥99%) obtained from MERCK KGaA and Manganese(II) nitrate tetrahydrate ($Mn(NO_3)_2 \cdot 4H_2O$, CAS 20094-39-7, ≥97%) obtained from Sigma-Aldrich. The polytetrafluoroethylene (PTFE, CAS 9002-84-0) embedded samples were prepared using PTFE, 60 wt % dispersion in water obtained from Sigma-Aldrich. Ammonium bicarbonate ($NH_4HCO_3$ CAS 1066-33-7) and $NH_3$ (CAS 1336-21-6) 25% solution were obtained from Chem Supply, Australia.

The catalyst was synthesized according to the following general method and according to the process shown in FIG. 1:

The $MnO_X/FeO_X$ catalyst powders are firstly synthesized via a modified co-precipitation method applying sonication. An equal molar ratio of $Fe(NO_3)_3 \cdot 9H_2O$ and $Mn(NO_3)_2 \cdot 4H_2O$ were pre-mixed in deionized water. The mixture was co-precipitated with pre-mixed $NH_4HCO_3$ and $NH_3$ alkaline solution in a continuous sonication enhanced co-precipitation reactor. The resulting precipitate was aged for 1 h at room temperature and triple washed with de-ionized (DI) water then once with acetone, followed by drying and calcination at 500° C. for 3 hours to obtain $MnO_X/FeO_X$ catalyst powder, also referred to as a calcined denitration catalyst having a grain size of less than about 0.5 μm.

The catalyst powders were then coated on pre-extruded ceramic honeycomb monolith substrate via a simple environmentally friendly wash coating technique. Commercially available ceramic cordierite ($2MgO-2Al_2O_3-5SiO_2$) 'honeycomb'-like monoliths supplied by Trunnett, (200 cpsi) were selected to support the catalyst samples for their low pressure drop and high surface area. The above prepared catalyst powder was first dry ring-milled for 5 min to reduce its particle size. It was then ball-milled in DI water for 2 h to further grind the powder and to ensure consistently mixed slurry. An appropriate amount of 60% PTFE dispersion was added prior to the ball-milling step to create catalysts of 2%, 5% 10% and 15% PTFE content by weight, respectively.

The wash-coating step involves dipping the monolith into the slurry. The excess catalyst was removed by applying a gentle flow of air through monolith channels, then the catalyst either re-calcined at 500° C. (if PTFE was not present in the catalyst) or 250° C. (for PTFE loaded catalysts). The catalyst loading was adjusted by controlling the catalyst loading in the slurry and by repeating the drying/dipping step, and all the total metal oxide loading was kept consistent at 21±1.1 w/w %. The samples are denoted as x % PTFE-$MnO_X/FeO_X$, where x is the PTFE loading in w/w %. A series of 10% PTFE-$MnO_X/FeO_X$ catalysts were dried after each coating at a set temperature—120, 150, 175, 200 or 225° C., respectively—and denoted as $T_a$, where a is the temperature of drying.

Example 1c—Synthesis of MnOx/FeOx Catalyst with Additive

All metal oxides ($MnO_X/FeO_X$) based catalyst samples were prepared using Iron(III) nitrate nonahydrate ($Fe(NO_3)_3 \cdot 9H_2O$, CAS 7782-61-8, ≥99%) obtained from MERCK KGaA and Manganese(II) nitrate tetrahydrate ($Mn(NO_3)_2 \cdot 4H_2O$, CAS 20094-39-7, ≥97%) obtained from Sigma-Aldrich. The cellulose siloxane (CS) embedded samples were prepared using combination of polymethylhydroxysiloxane (PMHS) (CAS 63148-57-2) and methyl cellulose (MC) (MW 86 kDa) (CAS 9004-67-5) from Sigma-Aldrich. Ammonium bicarbonate ($NH_4HCO_3$ CAS 1066-33-7) and $NH_3$ (CAS 1336-21-6) 25% solution were obtained from Chem Supply, Australia. The catalyst was synthesized according to the following general method and according to the process shown in FIG. 1.

The $MnO_X/FeO_X$ catalyst powders are firstly synthesized via a modified co-precipitation method applying sonication. An equal molar ratio of $Fe(NO_3)_3 \cdot 9H_2O$ and $Mn(NO_3)_2 \cdot 4H_2O$ were pre-mixed in deionized water. The mixture was co-precipitated with pre-mixed $NH_4HCO_3$ and $NH_3$ alkaline solution in a continuous sonication enhanced co-precipitation reactor. The resulting precipitate was aged for 1 h at room temperature and triple washed with de-ionized (DI) water then once with acetone, followed by drying and calcination at 500° C. for 3 hours to obtain $MnO_X/FeO_X$ catalyst powder, also referred to as a calcined denitration catalyst having a grain size of less than about 0.5 μm.

The catalyst powders were then coated on pre-extruded ceramic honeycomb monolith substrate via a simple environmentally friendly wash coating technique. Commercially available ceramic cordierite ($2MgO-2Al_2O_3-5SiO_2$) 'honeycomb'-like monoliths supplied by Trunnett, (200 cpsi) were selected to support the catalyst samples for their low pressure drop and high surface area. The above prepared catalyst powder was first dry ring-milled for 5 min to reduce its particle size. It was then ball-milled in DI water for 2 h to further grind the powder and to ensure consistently mixed slurry. An appropriate amount of cellulose siloxane mixture was added prior to the ball-milling step to create catalysts of 0.5%, 1% 2% and 5% cellulose siloxane content by weight, respectively.

The wash-coating step involves dipping the monolith into the slurry. The excess catalyst was removed by applying a gentle flow of air through monolith channels, then the catalyst either re-calcined at 500° C. (if CS was not present in the catalyst) or 250° C. (for CS loaded catalysts). The catalyst loading was adjusted by controlling the catalyst loading in the slurry and by repeating the drying/dipping step, and all the total metal oxide loading was kept consistent at 21±1.1 w/w %. The samples are denoted as x % CS—$MnO_X/FeO_X$, where x is the CS loading in w/w %.

Example 2a—Catalytic Testing of MnOx/FeOx Catalyst

The SCR activity measurement was carried out in a stainless-steel (SS) tubular downflow reactor (I.D. 9.0 mm)

loaded with 5 mm bed height of catalyst (sieved to 100-300 µm), which was held on a SS mesh (opening size<0.1 mm) supported by poriferous steel plate. A scheme of experimental set up is given in FIG. 1. Synthetic flue gas was prepared using mixtures of nitric oxide, NO (purity 99.9% from Coregas), ammonia, $NH_3$ (purity 99.999% from Air Liquide), oxygen, $O_2$ (from BOC) and nitrogen, $N_2$ (from BOC) via individually controlled mass flow controllers. The total flow was set at 200 mL/min under ambient conditions and the equivalent space velocity was 30,000 $h^{-1}$. The reactor was heated by a temperature programmable vertical split furnace (up to 1000° C. from Labec Equipment Pty. Ltd.). Reactant gases concentrations set varied as: 1000 ppm NO, 1000 ppm $NH_3$, 3% $O_2$ and balanced by $N_2$. The NO concentration was monitored continually by a Kane 905 flue gas analyser (Kane International, UK).

Figure 2:
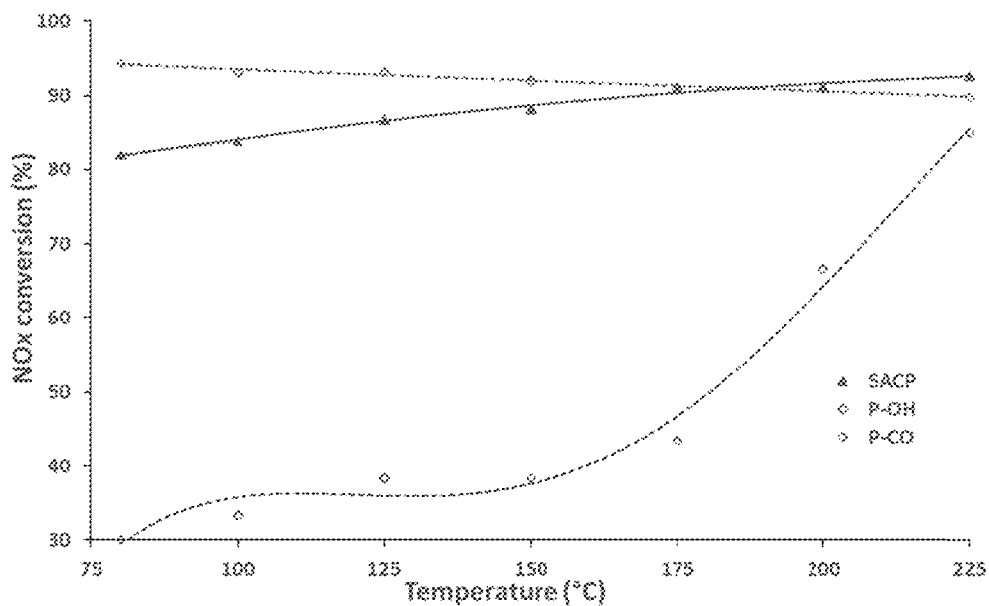
FIG. 2 is a graph showing NO conversion over SCP fabricated catalysts fabricated at different ammonia to ammonium bicarbonate ratios. (Feed: 1500 ppm NO, 1500 ppm $NH_3$, 3% O2 and Balance $N_2$ at GHSV 30000 $h^{-1}$).

SCR $DeNO_x$ performance of $MnO_x/FeO_y$ powder catalysts prepared via different methods is compiled and presented in FIG. 2. The results show that samples SACP (sonication assisted co-precipitation with mixed ammonia and ammonium bicarbonate as precipitant) and P—OH (co-precipitation with NaOH as precipitant) exhibit excellent performances, with P—OH proves slightly better at lower temperature range. P—OH can maintain $NO_x$ conversion of ~90% from 80 to 225° C. while SACP starts off with $NO_x$ conversion around ~80% and approaches 90% as temperature is elevated. Unexpectedly, at 225° C., SACP catalysts are showing slightly higher NOx conversions compared to P—OH, indicating greater thermal stability for both SACP catalysts at higher temperatures.

Although sharing similar fabrication method as P—OH, sample P—CO (co-precipitation with $Na_2CO_3$ as precipitant) displays the worst performance across the reaction temperatures, showing only less than 70% $NO_x$ conversion at 200° C.

Table 5 summarises the characterisation analysis of the catalysts. NOx conversions performance tests were conducted and linked to their morphologies physicochemical, and other characterisation observations. The inventors surprisingly found:

The catalysts were mesoporous, well-dispersed, predominantly loosely packed and even sized particles, providing high total pore volume.

The catalysts show high surface area, higher oxidation valency species, greater amount of $Fe^{3+}$ than $Fe^{2+}$ on the surface.

The catalyst show Lewis acid dominance at lower temperature SCR, having more Mn on the surface and therefore increasing availability of Brønsted acid sites and stability in higher temperature reactions.

TABLE 5

Qualitative summary for the catalysts characterisation and test results.

| Sample | SACP | P-OH | P-CO |
|---|---|---|---|
| Morphology | Similar size, spherical, loosely packed | Similar size, spherical, loosely packed | Embedded particles in larger beads of various size |
| Fe:Mn Bulk | Even | Less Mn | More Mn |
| Fe:Mn Surface | More Mn | Less Mn | More Mn |
| Crystallinity | Medium | High | Medium |
| $Fe^{3+}:Fe^{2+}$ Bulk | Even | Low | Even |
| $Fe^{3+}:Fe^{2+}$ Surface | Even | High | Low |
| $H_2$ reducibility at low temperatures | Yes | Somewhat | Somewhat |
| Surface area | Medium | High | Low |
| Total pore volume | High | High | Low |
| LT NOx Conversion | Excellent | Excellent | Lower |
| Lewis acid dominance | High | Highest | — |
| Bronsted acid dominance | Highest | Moderate | — |

Figure 3:
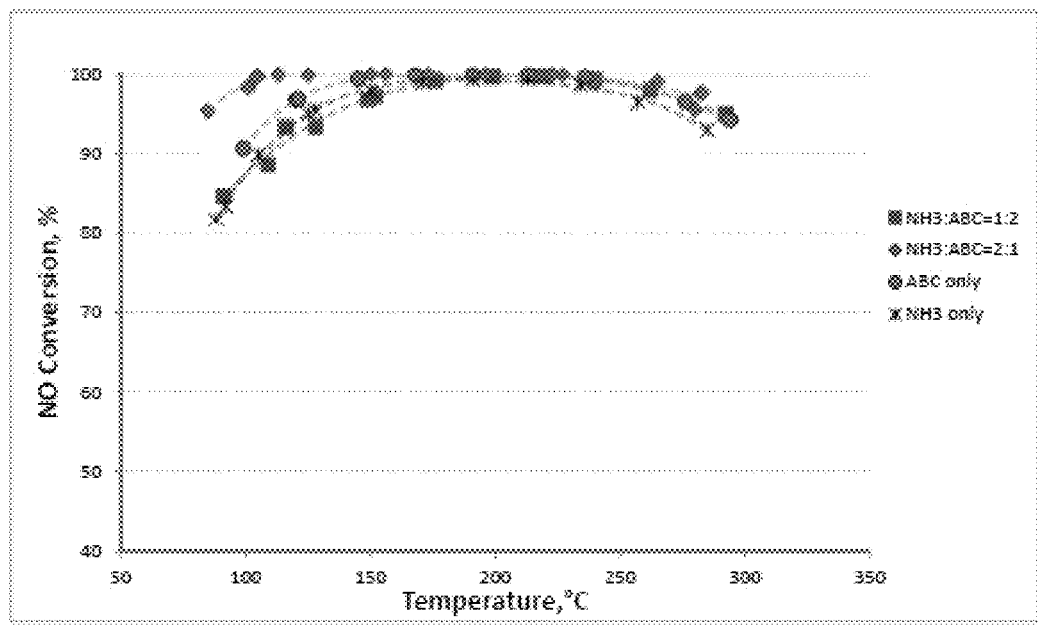
FIG. 3 is a graph showing $NO_X$ conversion performance of fabricated powdered catalysts, feed: 1000 ppm NO, 1000 ppm $NH_3$, 3% $O_2$, Balance $N_2$, GHSV 30000 $h^{-1}$.

Similar tests were conducted for the SCP powder catalysts precipitated using different ratios of ammonia to ammonium bicarbonate. FIG. 3 shows the NO conversions of these catalysts, all four tested samples were able to achieve over 95% efficiency at temperature 150-250° C. This indicates that the performance of catalysts is not vastly affected by precipitating agent ammonia to ammonium bicarbonate ratio; hence the catalysts powder surface and pore characteristics, minor phase differences, or intrinsic surface properties are not as crucial, in a way highlighting the robustness of sonicated assisted co-precipitation type catalysts.

Example 2b—Catalytic Testing of MnOx/FeOx Catalyst with Additive

A vertical tubular fixed-bed catalytic reactor (16 mm in diameter) was used for all catalyst activity testing. The feed gas composition are as follows: 500 ppm NO, 500 ppm $NH_3$, 3% $O_2$ and $N_2$ as balance. The gas hourly space velocity (GHSV) of reaction was set to 15,000 $h^{-1}$ or 30000 $h^{-1}$ as indicated. Water vapour, when applicable, was injected into a preheater (set at 350° C.) and maintained at 2, 3, 5 and 10 v/v %, respectively. The inlet and outlet feed gas composition were monitored using the KANE905 Commercial Flue Gas Analyzer (Kane International Ltd, UK) and recorded at set temperatures after reaching the steady state operation (typically 30 minutes).

Example 2b(i)—Effect of PTFE Doping on Catalyst Performance

Figure 4:
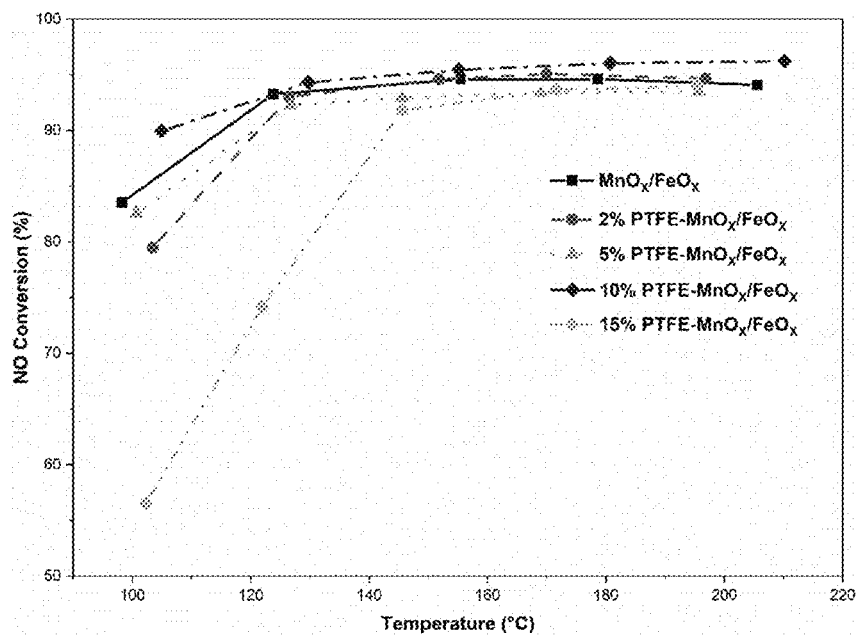
FIG. 4 is a graph showing NO reduction performance tests. $MnO_X/FeO_X$ (black), 2% PTFE-$MnO_X/FeO_X$ (red), 5% PTFE-$MnO_X/FeO_X$ (green) 10% PTFE-$MnO_X/FeO_X$ (blue) and 15% PTFE-$MnO_X/FeO_X$ (teal) catalyst samples. $NH_3$=$NO_X$=500 ppm, $O_2$=3%, $N_2$ balance, GHSV=30,000 $h^{-1}$.

The catalytic performance of the $MnO_X/FeO_X$ catalyst samples at different temperatures was affected by the percentage weight PTFE (x % PTFE-$MnO_X/FeO_X$). FIG. 4 shows the effect of PTFE loading on the NO conversion of the xPTFE %-$MnO_X/FeO_X$ (where x=2, 5, 10, 15 w/w %) compared to the control $MnO_X/FeO_X$ (x=0) based monolith catalyst at a gas hourly space velocity (GHSV) of 15000 $h^{-1}$. The performance of all samples, excluding 15% PTFE-$MnO_X/FeO_X$, improved as the temperature increased, until plateauing at approximately 125° C. with above 90% NO conversion. 15% PTFE (teal) loading caused a significant decrease in performance below 150° C., and notably did not reach plateau performance until approximately 145° C. Among all the catalyst, 10% PTFE-$MnO_X/FeO_X$ catalyst (blue) samples showed the best performance, particularly from approximately 100° C. to 125° C. PTFE loadings of 2% and 5% (red and green, respectively) had little impact on $MnO_X/FeO_X$ performance. At temperatures above 150° C., the performance of all catalysts reached a plateau of >90% NO conversion rate regardless the loading of PTFE in the catalysts, although the 10% PTFE-$MnO_X/FeO_X$ sample maintained slightly higher performance over the tested 100 to 220° C. temperature range. All other PTFE loaded catalyst samples maintained similar performance to the control above 150° C.

The 10% PTFE-MnO$_X$/FeO$_X$ catalyst maintained 90% NO conversion at 105° C., whereas the control achieved only 84% conversion at 98° C. with all other catalysts exhibiting reduced performance. Thus is appeared 10% PTFE loading may have enhanced the LT-SCR performance. Overall, 10% PTFE-MnO$_X$/FeO$_X$ loading is considered to show good potential as a catalyst additive and was therefore chosen for subsequent testing and characterization.

FIG. 4 indicates that the inclusion of (x %) PTFE within the MnO$_X$/FeO$_X$ catalysts at temperatures between 90° C. and 220° C. observably affected the NO conversion activity of catalysts.

Figure 5:
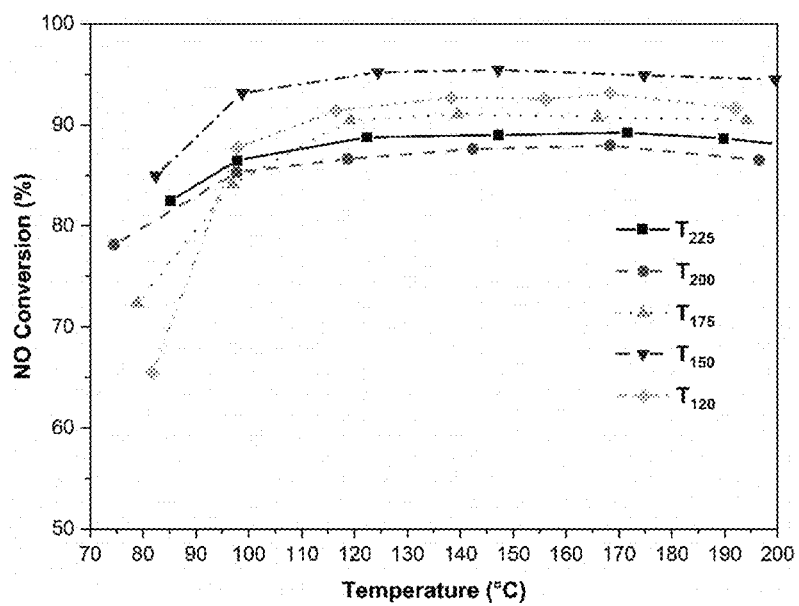
FIG. 5 is a graph showing NOx conversion of CS doped Mn/Fe mixed oxides catalysts in the feed gas (Feed gas contains 500 ppm NO, 500 ppm $NH_3$, 5% or 10% $H_2O$, 3% $O_2$ and balance $N_2$, GHSV 15000 $h^{-1}$).

The catalytic performance of 10% PTFE-MnO$_X$/FeO$_X$ catalyst (with comparable MnO$_X$/FeO$_X$ loading, 22±1.1% w/w) at the preparation temperatures 120, 150, 175, 200 and 225° C. (designated $T_{120}$, $T_{150}$, $T_{175}$, $T_{200}$ and $T_{225}$), respectively, was evaluated. FIG. 5 reports the NO conversion performance of these catalysts as a function of temperatures from 70 to 150° C. in dry conditions. The catalyst weight loadings were maintained within comparable range to minimize the effect of loading variation on their relative performance.

The performance of $T_{150}$ (blue) exhibited the best performance among the five tested sample drying temperatures within the temperature range of 70-150° C. All five samples achieved the NO conversion plateau at approximately 100° C.—above this temperature, to 150° C., the samples maintained an almost constant performance, whereas under 100° C., the samples showed distinctively different performances. For example, above 100° C., the performance of the samples presented almost five parallel curves with the order of $T_{150}$>$T_{120}$>$T_{175}$>$T_{225}$>$T_{200}$>80% conversion. However, at temperatures <100° C., the performances of all catalyst samples were reduced, with $T_{120}$ exhibiting the lowest NO conversion.

The results shown in FIG. 5 indicate an optimal sample preparation temperature of approximately 150° C. $T_{150}$ demonstrated a greater performance (~95%) than that of the unmodified catalyst (<90%, FIG. 4) under similar conditions.

Example 2b(ii)—Effect of CS Doping on Catalyst Performance

Figure 6:
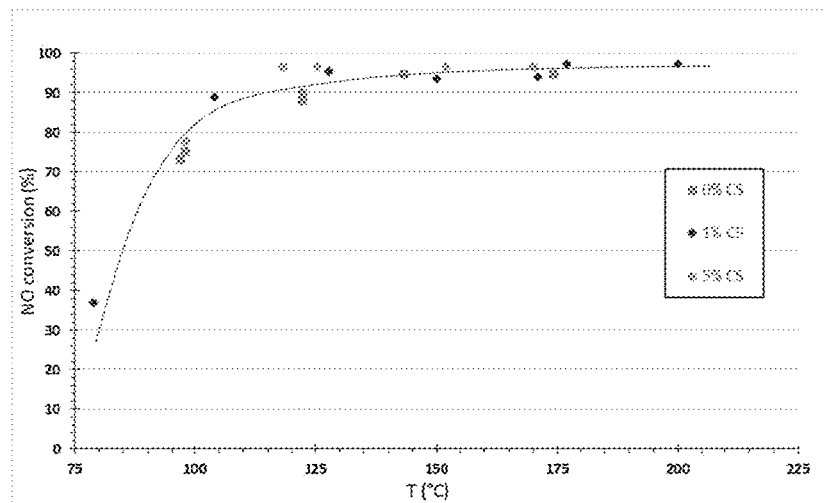
FIG. 6 is a graph showing NO reduction performance tests. Effect of drying temperature, 225° C. ($T_{225}$, black), 200° C. ($T_{200}$, red), 175° C. ($T_{175}$, green), 150° C. ($Ti_{150}$, blue) and 120° C. ($T_{120}$, teal), on the 10% PTFE-$MnO_X$/$FeO_X$ monolithic catalyst. $NH_3$=$NO_X$=500 ppm, $O_2$=3%, $N_2$ balance, GHSV=30,000 $h^{-1}$.

The catalytic performance of the MnO$_X$/FeO$_X$ catalyst samples at different temperatures was affected by the percentage weight CS (x % CS) with comparable MnO$_X$/FeO$_X$ loading, 22±1.1% w/w). FIG. 6 shows the effect of CS loading on the NO conversion of the CS doped catalyst (where x=1.5 w/w %) compared to the control MnO$_X$/FeO$_X$ (x=0) based monolith catalyst at a gas hourly space velocity (GHSV) of 15000 h$^{-1}$. The performance of all samples, improved as the temperature increased, until plateauing at approximately 125° C. with above 90% NO conversion. It is clear to see that doping the MnOx/FeOy catalyst by either 1 or 5% CS did not negatively affect the NOx conversion as the doped catalysts displayed similar or even slightly enhanced performance compared to the undoped catalyst.

Example 2b(iii)—Effect of Water Vapour on Catalysts

Figure 7:
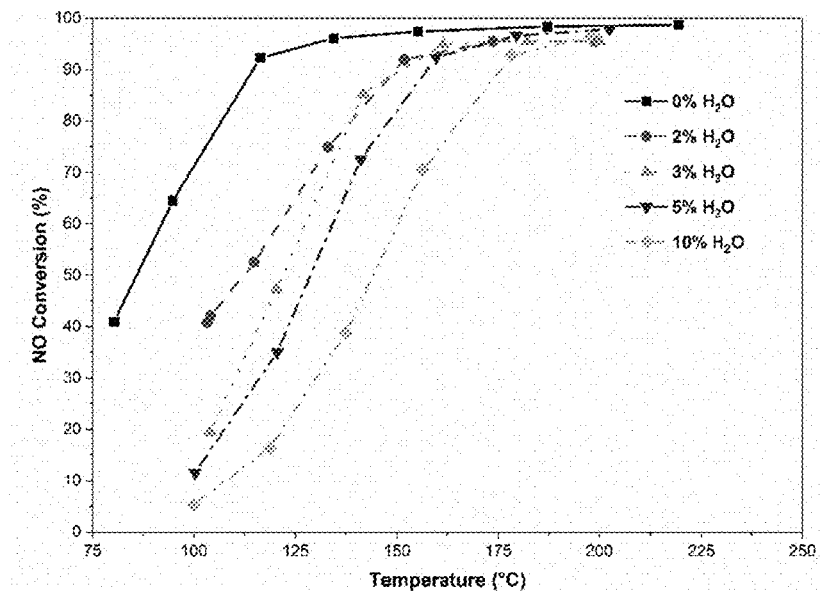
FIG. 7 is a graph showing unmodified monolithic catalyst ($MnO_X/FeO_X$) $NO_X$ reduction performance in the presence of 0% (black, square), 2% (red, circle), 3% (green, upward triangle), 5% (blue, downward triangle) and 10% (teal, diamond) v/v water vapour. $NH_3$=$NO_X$=500 ppm, $O_2$=3%, $N_2$ as balance, GHSV=15,000 $h^{-1}$.

It will be appreciated that the presence of water may impact on catalytic activity. The inventors have unexpectedly found that mixed metal MnO$_X$ catalysts exhibit consistently better water resistance than MnO$_X$ catalysts. FIG. 7 shows the NO conversion of the monolith-supported control catalyst MnO$_X$/FeO$_X$ (21% loading) in the presence of various water vapour contents (0-10% v/v water vapour) in the feed gas over a temperature range of 75-225° C.

The high performance of the control catalyst at low temperatures, ≥92% over a 115° C. to 220° C. range, may be attributed to the synergetic effects from structural and electronic changes induced by the introduction of Fe to the MnO$_X$ matrix of the catalyst; Fe often enhancing the re-oxidation of MnO$_X$, as well as providing additional acid sites for NH$_3$ and NO adsorption.

As expected, water vapour had a negative impact on the catalyst performance, particularly in the low temperature region (<150° C.). Higher water vapour content in the feed gas resulted in poorer performance within the tested temperature range. The effect of water vapour became less noticeable when the temperature was increased over 175° C., MnO$_X$/FeO$_X$ maintaining over 90% NO conversion even at 10% v/v water vapour content, indicating strong water vapour resistance of the catalyst at high temperature. Inhibition was negligible when the temperature was close to or above 200° C., all samples achieving >98% NO conversion regardless of water vapour content in the feed gas.

Figure 8:
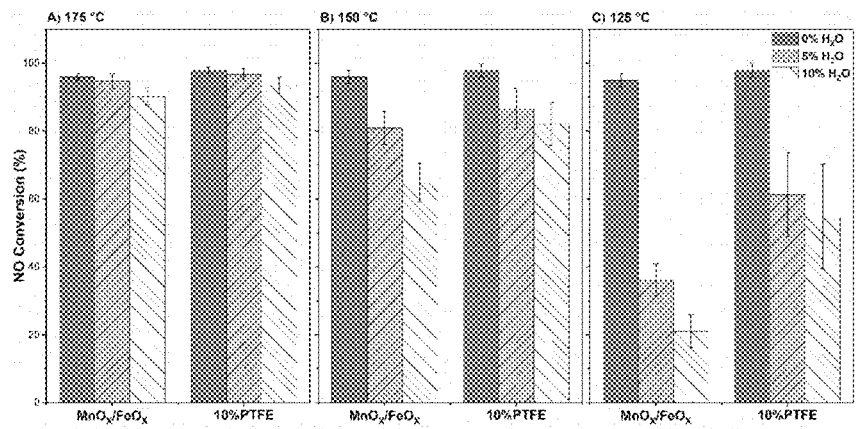
FIG. 8 is a graph showing NO conversion performance tests. $MnO_X/FeO_X$ based monolithic catalysts 0% PTFE-$MnO_X/FeO_X$ and 10% PTFE-$MnO_X/FeO_X$ in the presence of 0% (solid), 5% (upward diagonal) and 10% (downward diagonal) $H_2O$ vapour at a) 175°, b) 150 and c) 125° C. $NH_3$=$NO_X$=500 ppm, $O_2$=3%, $N_2$ balance, GHSV=15,000 $h^{-1}$.

FIG. 8 compares the NO conversion performance of the control catalyst and 10% PTFE-MnO$_X$/FeO$_X$ in various water vapour conditions (0, 5, 10% v/v) at 125° C., 150° C. and 175° C. In the absence of water vapour, both catalysts exhibited excellent performance (≥95%) over 125 to 175° C. range, with 10% PTFE-MnO$_X$/FeO$_X$ consistently having displayed marginally higher (98%) efficacy throughout.

10% PTFE-MnO$_X$/FeO$_X$ catalyst exhibited significantly greater resistance to the inhibitory effect of water vapour than the control catalyst. At 175° C. (FIG. 8A) the enhancement of water resistance was relatively subtle as the control catalyst already demonstrated high water vapour resistance with over 95% NO conversion, whereas at 150° C. (FIG. 8B) the effect was more pronounced. Notably, after the addition of 10% H$_2$O vapour it was observed that 10% PTFE-MnO$_X$/FeO$_X$ conferred a 16% improvement over the control performance. The effect is most significant at 125° C. (FIG. 8C) at both 5% and 10% H$_2$O vapour, where 10% PTFE loading resulted in nearly double the performance of the unmodified catalyst. The 10% PTFE-MnO$_X$/FeO$_X$ catalyst surprisingly provides improved performance, in addition to a simpler and more cost-effective method of modification for LT-SCR catalysts.

Figure 9A:
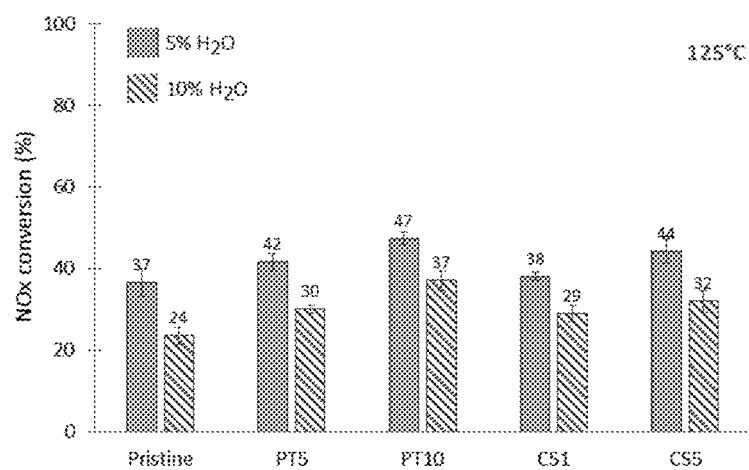
FIG. 9 is a graph showing NOx conversion of CS doped Mn/Fe mixed oxides catalysts with 5 vol % and 10 vol % water vapour additions in the feed gas at a) 125, b) 150, and c) 175° C. (Feed gas contains 500 ppm NO, 500 ppm $NH_3$, 5% or 10% $H_2O$, 3% $O_2$ and balance $N_2$, GHSV 15000 $h^{-1}$).
Figure 9B:
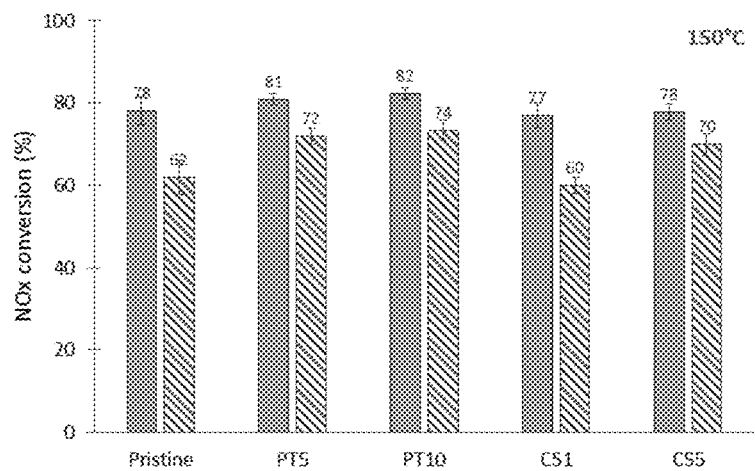
Figure 9C:
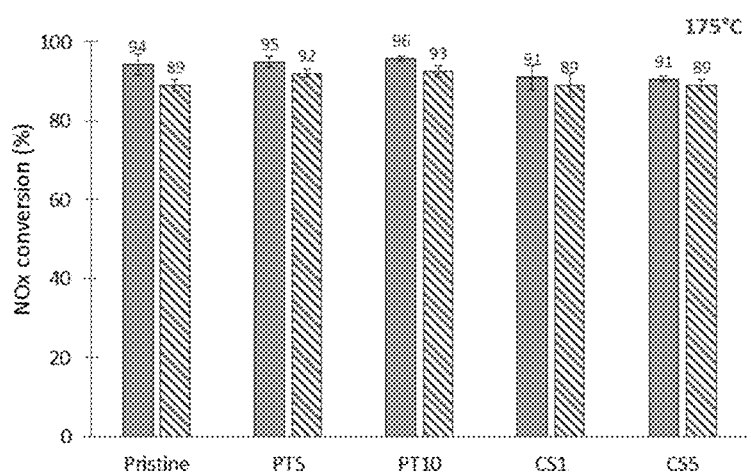

The catalysts performances were compared also when CS was used as the additive. FIG. 9A shows that at temperature 125° C., the pristine catalyst (without CS) achieved NOx conversion of 37% when 5% of water vapour present in the feed gas while it dropped to 24% at 10% water vapour content. FIGS. 9B and 9C shows the results at 150° C. and 175° C., respectively.

Doping the MnOx-FeOx catalyst with 1% CS has marginally increased (~5%) the NOx conversion in both 5% and 10% water content feed gases. Further increase in CS to 10% has seen a better improvement in water resistance with enhancement around 10%

Further advantages were found when doping with CS provided added benefits of easier slurry formation and stronger adhesion when coated on monolith supports allowing for catalyst scale up application or industry use.

Example 2b(iv)—Catalyst Phase Composition and Morphology

The surface area, pore volume and particle size of a catalyst may impact on the catalyst activity. The Brunauer- Emmett-Teller (BET) surface area and pore properties of the powder catalysts were determined to measure the nitrogen adsorption on the catalysts. The Brunauer-Emmett-Teller (BET) surface area and pore properties of the powder catalysts were determined via nitrogen adsorption at −196° C. Addition of PTFE into the catalyst resulted in a small increase of the surface area in 10% PTFE-MnO$_X$/FeO$_X$ of 73.57 m$^2$·g$^{-1}$ from the control, 71.76 m$^2$·g$^{-1}$.

Compared with the control catalyst, the addition of PTFE had a slight increase in the surface area, pore diameter and total pore volume of the 10% PTFE-MnO$_X$/FeO$_X$ catalyst. Lower PTFE loadings also exhibited a slight increase in surface area as well as pore diameter and total pore volume. The PTFE alone has a relatively low surface area, under 10 m$^2$·g$^{-1}$, and would be expected to reduce the surface area of the catalyst. However, the ball-milling of PTFE with the catalyst slurry prior to monolith wash coating would likely have reduced the particle size of the dopant, and therefore increase the overall surface area. Additionally, structural changes to the amorphous fraction of PTFE induced by the drying treatment of the PTFE doped catalyst may have resulted in enhancement of the available surface area. This enhancement may in turn contribute to the improved performance of 10% PTFE-MnO$_X$/FeO$_X$.

Example 3—Pressure Drop Analysis

Pressure drop across the monolith can be estimated using formula as below:

$$\Delta P = f \frac{L\rho v^2}{2D} + \rho g h$$

Where Darcy's friction factor, $$f = \frac{14.227}{Re}$$

and Reynold's Number, $$Re = \frac{\rho v D}{\mu}$$

L denotes monolith length (m), ρ denotes gas density (kg/m$^3$), v denotes gas velocity (m/s), D denotes monolith equivalent hydraulic diameter, g denotes gas specific gravity (kg/m$^3$), h denotes catalyst height (m), μ denotes gas viscosity (Pa·s).

Table 6 entails the technical specifications of the monolith used.

TABLE 6

| Specifications of monolith | |
| --- | --- |
| Supplier | Trunnett |
| Material | Cordierite (Al$_2$O$_3$:MgO:SiO$_2$) |
| Cell density (cells/in$^2$) | 200 |

TABLE 6-continued

| Specifications of monolith | |
| --- | --- |
| Supplier | Trunnett |
| Cell geometry | Square |
| Cell hydraulic diameter (mm) | 1.0 |
| Open voidage | 0.67 |

The pressure drops through the 200 CPSI blank monoliths at 1 atm were measured in the laboratory reactor system and the calculated pressure drops for the corresponding gas velocities and residence times were compared as shown in Table 7. Under all the experimental conditions, no measurable pressure drop has been observed.

TABLE 7

Measured and calculated pressure drops of specified gas velocities and residence times

| Gas velocity (m/s) | Residence time (s)/ GHSV (h$^{-1}$) | Pressure drop (Pa) | |
| --- | --- | --- | --- |
| | | Measured | Calculated |
| 0.32 | 0.06/60000 | n/d* | 1.0 |
| 0.16 | 0.12/30000 | n/d* | 0.5 |
| 0.08 | 0.24/15000 | n/d* | 0.3 |

*non-detectable by the pressure gauge used for monitoring the pressure

The invention claimed is:

1. A process for preparing a denitration catalyst, comprising:
   (a) preparing an aqueous mixed-metal nitrate solution consisting of a manganese nitrate, an iron nitrate and an alkaline precipitant which are continuously fed into a sonication-assisted co-precipitation reactor, to form a mixed-metal hydroxide salt precipitate in the form of a slurry collected from the reactor; and
   (b) calcining the mixed-metal hydroxide salt precipitate to form the denitration catalyst, wherein the grain size of the denitration catalyst is less than about 0.5 μm;
   wherein step (a) is sonication-assisted co-precipitation to form the mixed-metal hydroxide salt precipitate.

2. The process according to claim 1, further comprising step (b)(i) drying the mixed-metal hydroxide salt precipitate, and step (b)(ii) calcining the mixed-metal hydroxide salt precipitate to form the denitration catalyst, wherein the grain size of the denitration catalyst is less than about 0.5 μm.

3. The process according to claim 2, wherein drying step (b)(i) comprises applying a first temperature in a range of between about 80° C. to about 120° C. to the mixed-metal hydroxide salt precipitate for a first period of about 24 hours to about 48 hours to volatilise at least a portion of volatile material from the mixed-metal hydroxide salt precipitate.

4. The process according to claim 2, wherein calcining step (b)(ii) comprises applying a second temperature in a range of between about 300° C. to about 500° C. under controlled atmosphere for a second period of about 2 hours to about 10 hours such that a calcined denitration catalyst having a grain of less than 2 μm is provided.

5. The process according to claim 1, wherein the molar ratio of manganese nitrate to iron metal nitrate is between about 1:2 to 2:1.

6. The process according to claim 1, wherein step (a) further comprises aging the mixed-metal hydroxide salt precipitate at room temperature for between about 1 hour and 6 hours.

7. The process according to claim 6, wherein step (a) further comprises rinsing the aged mixed-metal hydroxide salt precipitate in a solvent system.

8. The process according to claim 1, wherein the alkaline precipitant is selected from an aqueous solution of ammonia, ammonium nitrate, ammonium hydroxide, ammonium bicarbonate, sodium hydroxide, sodium carbonate, or mixtures thereof.

9. The process according to claim 8, wherein the alkaline precipitant is an aqueous solution of ammonia and/or ammonium bicarbonate, wherein the ratio of ammonia to ammonium bicarbonate is about 1:2.

10. The process according to claim 1, wherein the sonication-assisted co-precipitation reactor has a power of 500 watts and a frequency of 20 kHz, and wherein the aqueous mixed-metal nitrate solution is continuously fed into the sonication-assisted co-precipitation reactor at a flow rate of 50 ml/s to 200 ml/s.

11. The process according to claim 10, wherein the sonication-assisted co-precipitation reactor has a stainless steel shell.

* * * * *